(12) United States Patent
Bahrami et al.

(10) Patent No.: US 11,868,731 B2
(45) Date of Patent: Jan. 9, 2024

(54) CODE RETRIEVAL BASED ON MULTI-CLASS CLASSIFICATION

(71) Applicant: FUJITSU LIMITED, Kanagawa (JP)

(72) Inventors: Mehdi Bahrami, San Jose, CA (US); Wei-Peng Chen, Fremont, CA (US)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 17/657,614

(22) Filed: Mar. 31, 2022

(65) Prior Publication Data

US 2023/0100208 A1 Mar. 30, 2023

Related U.S. Application Data

(60) Provisional application No. 63/261,602, filed on Sep. 24, 2021.

(51) Int. Cl.
*G06F 40/30* (2020.01)
*G06F 8/41* (2018.01)
(Continued)

(52) U.S. Cl.
CPC ............... *G06F 40/30* (2020.01); *G06F 8/30* (2013.01); *G06F 8/36* (2013.01); *G06F 8/42* (2013.01);
(Continued)

(58) Field of Classification Search
CPC ..... G06F 8/30; G06F 8/36; G06F 8/42; G06F 8/436; G06F 8/65; G06F 8/73;
(Continued)

(56) References Cited

U.S. PATENT DOCUMENTS

2012/0004922 A1* 1/2012 Monteverde ........... G06Q 30/02
707/706
2019/0303107 A1* 10/2019 Kelly ....................... G06F 9/453
(Continued)

FOREIGN PATENT DOCUMENTS

WO WO-2019223804 A1 * 11/2019

OTHER PUBLICATIONS

Gu, Xiaodong, et al., Deep Code Search, ICSE '18: Proceedings of the 40th International Conference on Software Engineering, May 2018, pp. 933-944, [retrieved on Apr. 7, 2023], Retrieved from the Internet: <URL:http://dl.acm.org/>.*
(Continued)

*Primary Examiner* — Geoffrey R St Leger
(74) *Attorney, Agent, or Firm* — Fujitsu IP Center; Tiep H. Nguyen

(57) ABSTRACT

According to an aspect of an embodiment, operations include receiving a set of NL descriptors and a corresponding set of PL codes. The operations further include determining a first vector associated with each NL descriptor and a second vector associated with each PL code, using language models. The operations further include determining a number of a set of semantic code classes to cluster the set of PL codes into the set of semantic code classes, based on the number, the first vector, and the second vector. The operations further include training a multi-class classifier model to predict a semantic code class, from the set of semantic code classes, corresponding to an input NL descriptor. The operations further include selecting an intra-class predictor model based on the predicted semantic code class. The operations further include training the intra-class predictor model to predict a PL code corresponding to the input NL descriptor.

20 Claims, 10 Drawing Sheets

(51) Int. Cl.

| | |
|---|---|
| G06F 40/216 | (2020.01) |
| G06F 18/22 | (2023.01) |
| G06F 18/20 | (2023.01) |
| G06F 18/23213 | (2023.01) |
| G06N 3/04 | (2023.01) |
| G06F 8/73 | (2018.01) |
| G06F 40/166 | (2020.01) |
| G06F 40/40 | (2020.01) |
| G06F 40/211 | (2020.01) |
| G06F 40/242 | (2020.01) |
| G06F 8/30 | (2018.01) |
| G06N 3/08 | (2023.01) |
| G06F 40/44 | (2020.01) |
| G06F 8/36 | (2018.01) |
| G06F 8/65 | (2018.01) |
| G06F 11/36 | (2006.01) |
| G06F 16/951 | (2019.01) |

(52) U.S. Cl.
CPC ............... *G06F 8/436* (2013.01); *G06F 8/65* (2013.01); *G06F 8/73* (2013.01); *G06F 11/3624* (2013.01); *G06F 16/951* (2019.01); *G06F 18/22* (2023.01); *G06F 18/23213* (2023.01); *G06F 18/285* (2023.01); *G06F 40/166* (2020.01); *G06F 40/211* (2020.01); *G06F 40/216* (2020.01); *G06F 40/242* (2020.01); *G06F 40/40* (2020.01); *G06F 40/44* (2020.01); *G06N 3/04* (2013.01); *G06N 3/08* (2013.01)

(58) Field of Classification Search
CPC .... G06F 11/3624; G06F 40/40; G06F 40/166; G06F 40/211; G06F 40/216; G06F 40/242; G06F 18/22; G06F 18/23213; G06F 18/285; G06F 16/951; G06N 3/04; G06N 3/08
See application file for complete search history.

(56) References Cited

U.S. PATENT DOCUMENTS

| | | | | |
|---|---|---|---|---|
| 2020/0117446 A1* | 4/2020 | Smith | .................. | G06F 9/4451 |
| 2021/0141863 A1* | 5/2021 | Wu | ........................ | G06N 3/08 |
| 2022/0138240 A1* | 5/2022 | Bahrami | .................. | G06N 3/04 |
| | | | | 717/120 |

OTHER PUBLICATIONS

Feng, Z., et al., "CodeBert: A Pretrained Model for Programming and Natural Languages," arXiv2002.08155v4, Sep. 18, 2020, 12 Pages.

Devlin, J., "BERT: Pre-training of Bidirectional Transformers for Language Understanding," arXiv1810.04805v2, May 24, 2019, 16 pages.

Husain, H., et al., "Codesearchnet challenge: Evaluating the state of semantic code search," arXiv 1909.09436v1, Sep. 20, 2019, 6 pages.

Bahrami, M., et al., "Augmented Code Model," (2021) printout from HuggingFace NLP library, accessed at https;//huggingface.co/Fujitsu/AugCode, on Mar. 31, 2022, 3 pages.

Tibshirani, R., et al., "Estimating the number of clusters in a data set via the gap statistic," Journal of Royal Statistical Society: Series B (Stastical Methodology) 63.2 (2001), 13 pages.

Printout from Scikit-learn project website, titled "Selecting the number of clusters with silhouette analysis on KMeans clustering," accessed at https://scikit-learn.org/stable/auto_examples/cluster/plot_kmeans_silhouette_analysis.html#selecting-the-number-of-clusters-with-silhouette-analysis-on-kmeans-clustering, on Mar. 31, 2022, 4 pages.

Bholowalia, P., et al., "EBK-means: A clustering technique based on elbow method and k-means in WSN," International Journal of Computer Applications, 105.9 (2014), 8 pages.

* cited by examiner

```
Args:
    Url (string): URL of the object to download
    Url (string): Full path where object will be saved
    Hash_prefix (string, optional): if not none, the SHA downloaded file should start with hash_prefix
        Default: None
    Progress (pool, optional): whether or not to display a progress bar
        Default: True Example:
    >>> torch.hub.download_url_to_file('https://s3.amazonnews.com/pytorch/models.pth'
```
— 302

```
file_size = None
#We use a different API for python since urllib(2) doesn't recognize the CA
req = Request(url, headers = {"User-Agent":"torch.hub"})
u = urlopen(req)
meta = u.info()
if hasattr(meta, 'getheaders'):
    content_length = meta.getheaders("Content-Length")
else:
    content_length = meta.get_all("Content-Length")
if content_length is not None and len(content_length) > e:
    file_size = int(content_length[0])
```
— 304

CODE RETRIEVAL BASED ON MULTI-CLASS CLASSIFICATION

CROSS-REFERENCE TO RELATED APPLICATIONS/INCORPORATION BY REFERENCE

This application claims priority to U.S. Provisional Patent Application Ser. No. 63/261,602 filed on Sep. 24, 2021, titled, "Library Corpus for Large-Scale Language Models and Code Retrieval Models Using Augmented Code", the entire content of which is hereby incorporated herein by reference.

FIELD

The embodiments discussed in the present disclosure are related to systems and methods for retrieval of source codes based on a multi-class classification.

BACKGROUND

Advancements in the field of machine learning and Artificial Intelligence (AI) have led to the development of various language models that may be used to convert a textual string into a corresponding numerical value, such as, a vector. The numerical value may, then, be used in various application areas such as, language translation, semantic analysis, synonym identification, antonym identification, sentiment analysis, and other natural language processing tasks. For example, with the growth of the software industry, management of source codes has become an important task in many organizations. For source code re-use, retrieval of an appropriate source code from a source-code repository may be performed, based on a query including a text string, by use of language models. Conventional solutions for source code retrieval may be complex and time consuming due to the sheer number of lines of code in each of the source codes and possible combinations of text strings that may be associated with each of the source codes. Thus, there is a need for a solution for efficient source code retrieval based on textual strings.

The subject matter claimed herein is not limited to embodiments that solve any disadvantages or that operate only in environments such as those described above. Rather, this background is only provided to illustrate one example technology area where some embodiments described herein may be practiced.

SUMMARY

According to an aspect of an embodiment, a method may include a set of operations that may include receiving a set of natural language (NL) descriptors and a corresponding set of programming language (PL) codes. The operations may further include determining a first vector associated with each of the received set of NL descriptors, based on a first language model. The operations may further include determining a second vector associated with each of the received set of PL codes, based on a second language model. The second language model may be different from the first language model. The operations may further include determining, using a statistical model, a number of a set of semantic code classes to cluster the set of PL codes. The operations may further include clustering the set of PL codes into the set of semantic code classes, based on the determined number, the determined first vector, and the determined second vector. The operations may further include training a multi-class classifier model configured to predict a semantic code class, from the set of semantic code classes, corresponding to an input NL descriptor. The predicted semantic code class may be associated with a PL code corresponding to the input NL descriptor. The multi-class classifier model may be trained based on the set of NL descriptors, the set of PL codes corresponding to the set of NL descriptors, and the set of semantic code classes in which the set of PL codes may be clustered. The operations may further include selecting an intra-class predictor model from a set of intra-class predictor models, based on the predicted semantic code class. The operations may further include training the selected intra-class predictor model based on the input NL descriptor. The selected intra-class predictor model may be configured to predict the PL code corresponding to the input NL descriptor.

The object and advantages of the embodiments will be realized and achieved at least by the elements, features, and combinations particularly pointed out in the claims.

It is to be understood that both the foregoing general description and the following detailed description are merely examples and explanatory and are not restrictive of the invention, as claimed.

BRIEF DESCRIPTION OF THE DRAWINGS

Example embodiments will be described and explained with additional specificity and detail through the use of the accompanying drawings in which:

FIG. 3 is a diagram that illustrates an exemplary scenario for a Natural Language (NL) descriptor and a Programming Language (PL) code;

Figure 1:
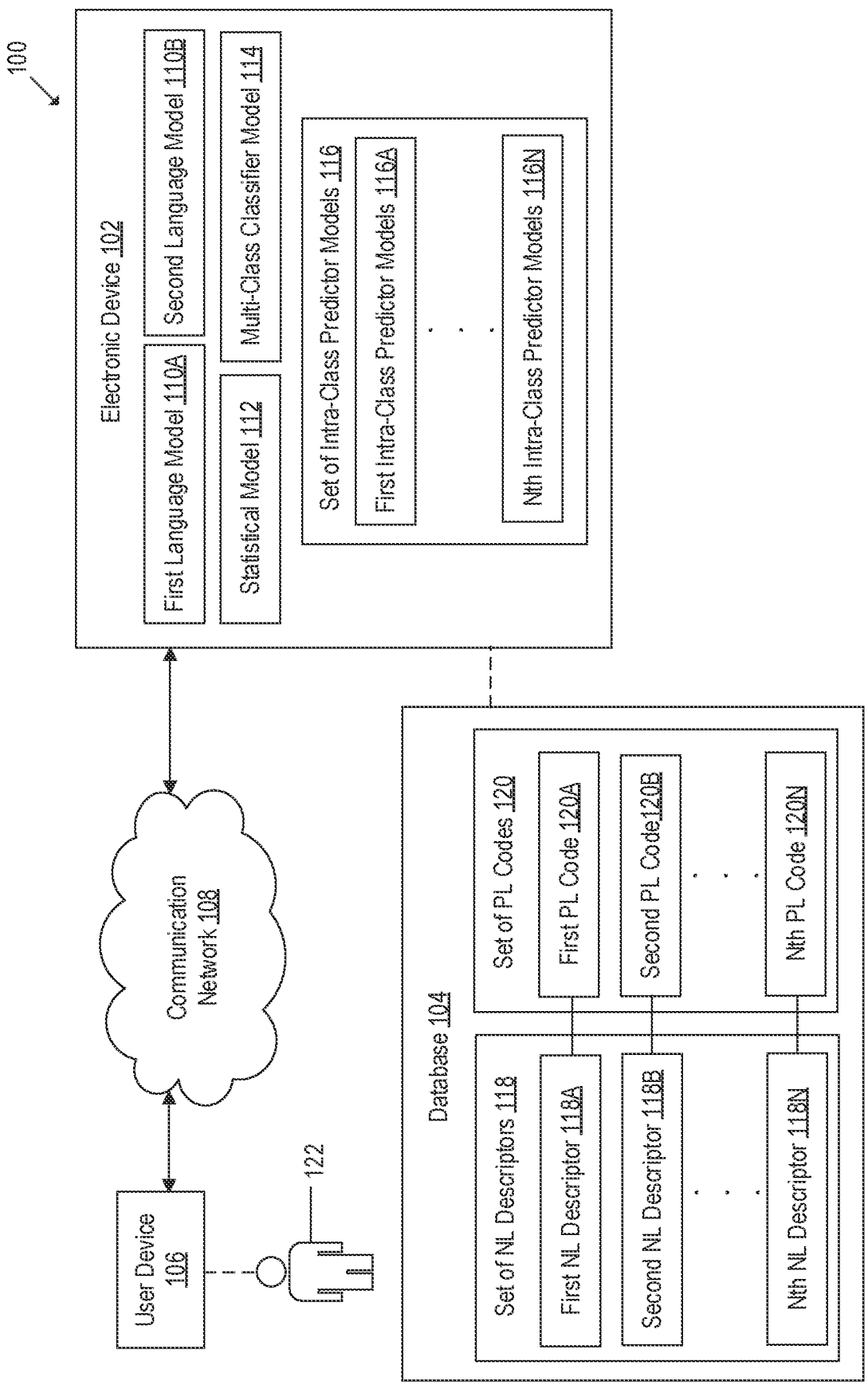
FIG. 1 is a diagram representing an example network environment related to a retrieval of source codes based on a multi-class classifier model.

all according to at least one embodiment described in the present disclosure.

DESCRIPTION OF EMBODIMENTS

Some embodiments described in the present disclosure relate to a method for code retrieval based on a multi-class classifier. In the present disclosure, a set of natural language (NL) descriptors and a corresponding set of programming language (PL) codes may be received from a server, a database code repository, and so on. Further, a first vector, associated with each of the received set of NL descriptors, may be determined based on a first language model. A second vector, associated with each of the received set of PL codes, may be determined based on a second language model. The second language model may be different from the first language model. Further, a number of a set of semantic code classes may be determined using a statistical model. The set of PL codes may be clustered into the set of semantic code classes. The set of PL codes may be clustered into the set of semantic code classes based on the determined number, the determined first vector, and the determined second vector. Further, a multi-class classifier model, which may be configured to predict a semantic code class from the set of semantic code classes, may be trained. The semantic code class may correspond to an input NL descriptor. The predicted semantic code class may be associated with a PL code corresponding to the input NL descriptor. The multi-class classifier model may be trained based on the set of NL descriptors, the set of PL codes corresponding to the set of NL descriptors, and the set of semantic code classes in which the set of PL codes may be clustered. Further, an intra-class predictor model may be selected from a set of intra-class predictor models based on the predicted semantic code class. The selected intra-class predictor model may be trained based on the input NL descriptor. The selected intra-class predictor model may be configured to predict the PL code corresponding to the input NL descriptor.

According to one or more embodiments of the present disclosure, the technological field of Artificial Intelligence (AI) models may be improved by configuring a computing system in a manner that the computing system may be able to retrieve source code based on a multi-class classifier. The computing system may receive a set of natural language (NL) descriptors and a corresponding set of programming language (PL) codes. The computing system may determine a first vector associated with each of the received set of NL descriptors, based on a first language model. Further, the computing system may determine a second vector associated with each of the received set of PL codes, based on a second language model. The second language model may be different from the first language model. The computing system may determine, using a statistical model, a number of a set of semantic code classes to cluster the set of PL codes. Further, the computing system may cluster the set of PL codes into the set of semantic code classes, based on the determined number, the determined first vector, and the determined second vector. The computing system may train a multi-class classifier model configured to predict a semantic code class, from the set of semantic code classes, corresponding to an input NL descriptor. The predicted semantic code class may be associated with a PL code corresponding to the input NL descriptor. The multi-class classifier model may be trained based on the set of NL descriptors, the set of PL codes corresponding to the set of NL descriptors, and the set of semantic code classes in which the set of PL codes may be clustered. The computing system may further select an intra-class predictor model from a set of intra-class predictor models, based on the predicted semantic code class. Thereafter, the computing system may train the selected intra-class predictor model based on the input NL descriptor. The selected intra-class predictor model may be configured to predict the PL code corresponding to the input NL descriptor.

Source code retrieval may be useful for source code re-use within an organization or across organizations. For search code retrieval, a natural language based textual string may be used as a query to search for a source code from a source code corpus to retrieve a programming language code that may be related to the textual string in the query. Conventional solutions for source code retrieval based on textual strings may be complex and time consuming due to a large number of source codes that may be required to be searched from the source code corpus. The complexity involved in the process of the source code retrieval may be further exasperated by a sheer number of lines of code in each source code segment, and a number of possible combinations of text strings that may be associated with each of the source code segments. For example, with millions or billions of lines of source codes, it may be infeasible to train and fine-tune language models to search and retrieve a source code segment, given a textual query.

On the other hand, the disclosed electronic device may simplify the retrieval of source codes, such as PL codes, based on a classification of a large corpus of PL codes and associated NL descriptions into a set of semantic code classes. The disclosed electronic device may train a multi-class classifier model and a set of intra-class predictor models, where each of the set of intra-class predictor models may be associated with a certain semantic code classes from the classified set of semantic code classes. The multi-class classifier model may be configured to predict a semantic code class of the set of semantic code classes, corresponding to a queried NL descriptor. An intra-class predictor model associated with the semantic code class predicted for the queried NL descriptor may be configured to predict a PL code corresponding to the queried NL descriptor query. Herein, the PL code corresponding to the queried NL descriptor may be predicted from a set of PL codes that may be classified into the semantic code class predicted for the queried NL descriptor. Thus, the PL codes may be semantically classified into the various semantic code classes. As the multi-class classifier model may predict the semantic code class associated with the queried NL descriptor, a search space for the semantic search problem to predict an appropriate PL code may be reduced to a set of PL codes that may belong to the predicted semantic code class. The intra-class predictor model, which may be associated with the predicted semantic code class, may search through the reduced search space (associated with the predicted semantic code class) to predict the appropriate PL code associated with the queried NL descriptor. Therefore, an overall complexity and time involved in the search (prediction) and retrieval of a PL code based on a queried NL descriptor may be significantly reduced, as each semantic code class may include a lesser number of PL codes as compared to the total number of PL codes in the corpus of PL codes.

Embodiments of the present disclosure are explained with reference to the accompanying drawings.

FIG. 1 is a diagram representing an example network environment related to a retrieval of source codes based on a multi-class classifier model, arranged in accordance with at least one embodiment described in the present disclosure. With reference to FIG. 1, there is shown an example network environment 100. In the example network environment 100, there is shown an electronic device 102, a database 104, a user device 106, and a communication network 108. The electronic device 102 may include a first language model 110A, a second language model 110B, a statistical model 112, a multi-class classifier model 114, and a set of intra-class predictor models 116. The set of intra-class predictor models 116 may include a first intra-class predictor model 116A, a second intra-class predictor model 116B, . . . and an $N^{th}$ intra-class predictor model 116N. The database 104 may include a set of natural language (NL) descriptors 118 and a set of programming language (PL) codes 120. The set of NL descriptors 118 may include a first NL descriptor 118A, a second NL descriptor 118B, . . . and an $N^{th}$ NL descriptor 118N. The set of PL codes 120 may include a first PL code 120A, a second PL code 120B, . . . and an $N^{th}$ PL code 120N. The first NL descriptor 118A may correspond to the first PL code 120A. Similarly, the second NL descriptor 118B may correspond to the second PL code 120B, . . . and the $N^{th}$ NL descriptor 118N may correspond to the $N^{th}$ PL code 120N. The electronic device 102, the database 104, and the user device 106 may be communicatively coupled to each other via the communication network 108. There is further shown a user 122 who may operate or may be associated with the electronic device 102 or the user device 106. In an embodiment, the electronic device 102 may include the database 104. In other embodiments, the database 104 may be separate from the electronic device 102.

The N number of NL descriptor, PL codes, and intra-class predictor models shown in FIG. 1 are presented merely as an example. The set of NL descriptor, the set of PL codes, and the set of intra-class predictor models may include only two or more than N NL descriptor, PL codes, and intra-class predictor models, respectively, without deviation from the scope of the disclosure. For the sake of brevity, only N NL descriptor, PL codes, and intra-class predictor models, have been shown in FIG. 1. However, in some embodiments, there may be more than N NL descriptor, PL codes, and intra-class predictor models, without limiting the scope of the disclosure.

The electronic device 102 may include suitable logic, circuitry, and interfaces that may be configured to retrieve a source code from the database 104 based on a multi-class classifier. The electronic device 102 may be configured to perform a plurality of operations to train the multi-class classifier model 114 configured to predict semantic code classes associated with input NL descriptors. The electronic device 102 may be further configured to train the set of intra-class predictor models 116 configured to predict PL codes classified in a specific semantic code class and associated with the input NL descriptors.

In accordance with an embodiment, the electronic device 102 may receive an instruction from a user (e.g., the user 122) as a user input for training of the multi-class classifier model 114 and the set of intra-class predictor models 116. Based on the received instruction in the user input, the electronic device 102 may receive the set of NL descriptors 118 and the corresponding set of PL codes 120 from the database 104. In accordance with an embodiment, the electronic device 102 may determine a first vector associated with each of the received set of NL descriptors 118, based on the first language model 110A. The first vector associated with each of the set of NL descriptors 118 may be a numerical representation associated with each of the respective NL descriptors in the set of NL descriptors 118. For example, the first vector associated with the first NL descriptor 118A may be a numerical representation of the first NL descriptor 118A. The first language model 110A may include, but is not limited to, a Bi-directional Encoder Representations from Transformer (BERT) language model, a Generative Pre-trained Transformer-2 (GPT-2) language model, a GPT-3 language model, or a Deep Neural Network (DNN)-based natural language processing (NLP) model. In accordance with an embodiment, the electronic device 102 may determine a second vector associated with each of the received set of PL codes 120, based on the second language model 110B. The second vector associated with each of the set of PL codes 120 may be a numerical representation associated with each of the respective PL codes in the set of PL codes 120. For example, the second vector associated with the first PL code 120A may be a numerical representation of the first PL code 120A. The second language model 110B may include, but is not limited to, an Augmented Code (Aug-Code) language model, a Code-BERT language model, or a Code-GPT language model.

In accordance with an embodiment, the electronic device 102 may use a statistical model (such as, the statistical model 112) to determine the number of a set of semantic code classes to cluster the set of PL codes 120. The statistical model 112 used to determine the number of the set of semantic code classes may include, but is not limited to, a gap statistical model, an average silhouette statistical model, or an elbow statistical model. Each class in the set of semantic code classes may correspond to an abstract syntax tree (AST) representation associated with a PL code grammar, a NL language grammar associated with an NL code descriptor, a set of synonymous words and codes, a code similarity metrics, or a set of semantically equivalent words and codes.

In accordance with an embodiment, the electronic device 102 may cluster the set of PL codes 120 into the set of semantic code classes, based on the determined number, the determined first vector, and the determined second vector. The electronic device 102 may determine a feature vector associated with each pair of NL descriptor (of the set of NL descriptors 118) and corresponding PL code (of the set of PL codes 120). The electronic device 102 may determine the feature vector associated with each pair of NL descriptor and corresponding PL code through a concatenation of the first vector associated with each NL descriptor and the second vector associated with corresponding PL code. For example, the first vector associated with the first NL descriptor 118A may be concatenated with the second vector associated with the first PL code 120A to determine the feature vector associated with the pair of the first NL descriptor 118A and the first PL code 120A. The electronic device 102 may cluster the set of PL codes 120 into the set of semantic code classes based on the feature vector associated with each pair of NL descriptor and corresponding PL code. The set of PL codes 120 may be clustered into the set of semantic code classes using a k-means clustering technique. The k-means clustering technique may perform clustering based on a mean of a numerical representation of each semantic code class of the set of semantic code classes and the feature vector associated with each pair of NL descriptor and corresponding PL code.

In accordance with an embodiment, the electronic device 102 may train the multi-class classifier model 114 configured to predict a semantic code class, from the set of semantic code classes, corresponding to an input NL descriptor. The electronic device 102 may train the multi-class classifier model 114 based on a dataset that comprises the set of NL descriptors 118 and the set of PL codes 120, where each NL descriptor in the set of NL descriptors 118 may correspond to a PL code in the set of PL codes 120. The multi-class classifier model 114 may be further trained based on the set of semantic code classes in which the set of PL codes are clustered. The multi-class classifier model 114 may predict a sematic code class from the set of semantic code classes as an output, given an input NL descriptor. The predicted semantic code class may be associated with a PL code corresponding to the input NL descriptor. The associated PL code in the set of PL codes 120 may be clustered in the semantic code class predicted by the multi-class classifier model 114. Similarly, the multi-class classifier model 114 may predict other sematic code classes from the set of semantic code classes as output based on other input NL descriptors.

In accordance with an embodiment, the electronic device 102 may select an intra-class predictor model from a set of intra-class predictor models (such as, the set of intra-class predictor models 116), based on the predicted semantic code class. Each semantic code class of the set of semantic code classes may be associated with an intra-class predictor model. The selected intra-class predictor model may be associated with the predicted semantic code class. Similarly, intra-class predictor models associated with other semantic code classes of the set of semantic code classes may be selected based on the output of the multi-class classifier model 114.

In accordance with an embodiment, the electronic device 102 may train the selected intra-class predictor model based on the input NL descriptor. The selected intra-class predictor model may be configured to predict the PL code corresponding to the input NL descriptor. Similarly, the intra-class predictor models associated with the other semantic code classes may be trained based on the other input NL descriptors. The intra-class predictor models associated with the other semantic code classes may be configured to predict other PL codes of the set of PL codes 120 corresponding to the other input NL descriptors. Details related to the training of the multi-class classifier model 114 and set of intra-class predictor models 116 are provided further, for example, in FIG. 4.

Examples of the electronic device 102 may include, but are not limited to, a source-code management machine, a mobile device, a desktop computer, a laptop, a computer workstation, a computing device, a mainframe machine, a server, such as a cloud server, and a group of servers. In one or more embodiments, the electronic device 102 may include a user-end terminal device and a server communicatively coupled to the user-end terminal device. The electronic device 102 may be implemented using hardware including a processor, a microprocessor (e.g., to perform or control performance of one or more operations), a field-programmable gate array (FPGA), or an application-specific integrated circuit (ASIC). In some other instances, the electronic device 102 may be implemented using a combination of hardware and software.

The database 104 may include suitable logic, interfaces, and/or code that may be configured to store the set of NL descriptors 118 and the set of PL codes 120. The database 104 may be derived from data off a relational or non-relational database, or a set of comma-separated values (csv) files in conventional or big-data storage. The database 104 may be stored or cached on a device, such as the electronic device 102 or a server. The device storing the database 104 may be configured to retrieve NL descriptors from the set of NL descriptors 118 and PL codes from the set of PL codes 120. In some embodiments, the database 104 may be hosted on a device at the same location as the electronic device 102. Alternatively, the database 104 may be hosted on a device at a location different from the electronic device 102. The operations of the database 104 may be executed using hardware including a processor, a microprocessor (e.g., to perform or control performance of one or more operations), a field-programmable gate array (FPGA), or an application-specific integrated circuit (ASIC). In some other instances, the database 104 may be implemented using software.

The user device 106 may include suitable logic, circuitry, and interfaces that may be configured to send instructions to the electronic device 102. The instructions may control the electronic device 102 to receive the set of NL descriptors 118 and the corresponding set of PL codes 120 from the database 104. The instructions may include an NL descriptor that may be queried by the user 122. Hereinafter, such NL descriptor is referred as a queried NL descriptor. The user device 106 may receive an output PL code corresponding to the queried NL descriptor, from the electronic device 102. The user device 106 may be further configured to render the received PL code corresponding to the queried NL descriptor. Examples of the user device 106 may include, but are not limited to, a mobile device, a desktop computer, a laptop, a computer workstation, a computing device, a mainframe machine, a server, such as a cloud server, and a group of servers. Although in FIG. 1, the user device 106 is separated from the electronic device 102; however, in some embodiments, the user device 106 may be integrated in the electronic device 102, without a deviation from the scope of the disclosure.

The communication network 108 may include a communication medium through which the electronic device 102 may communicate with the database 104 and the user device 106. Examples of the communication network 108 may include, but are not limited to, the Internet, a cloud network, a Wireless Fidelity (Wi-Fi) network, a Personal Area Network (PAN), a Local Area Network (LAN), and/or a Metropolitan Area Network (MAN). Various devices in the example environment 100 may be configured to connect to the communication network 108, in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), ZigBee, EDGE, IEEE 802.11, light fidelity (Li-Fi), 802.16, IEEE 802.11s, IEEE 802.11g, multi-hop communication, wireless access point (AP), device to device communication, cellular communication protocols, and/or Bluetooth (BT) communication protocols, or a combination thereof.

Each multi-class classifier model 114 and the set of intra-class predictor models 116 may be a machine learning (ML) model. The ML model may be a classifier model (in case of the multi-class classifier model 114) or a regression model (in case of each of the set of intra-class predictor models 116). The ML model may be trained to identify a relationship between inputs, such as features in a training dataset and output labels, such as, semantic code classes and/or predicted PL code. The ML model may be defined by its hyper-parameters, for example, number of weights, cost function, input size, number of layers, and the like. The parameters of the ML model may be tuned, and weights may be updated so as to move towards a global minima of a cost function for the ML model. After several epochs of the training on the feature information in the training dataset, the ML model may be trained to output a classification/prediction result for a set of inputs. The classification/prediction result may be indicative of a class label for each input of the set of inputs (e.g., a semantic code class or a corresponding PL code from new/unseen instances of an NL descriptor).

The ML model may include electronic data, which may be implemented as, for example, a software component of an application executable on the electronic device 102. The ML model may rely on libraries, external scripts, or other logic/instructions for execution by a processing device, such as, the electronic device 102. The ML model may include code and routines configured to enable a computing device, such as, the electronic device 102, to perform one or more operations to retrieve source code based on a queried NL descriptor. Additionally, or alternatively, the ML model may be implemented using hardware including a processor, a microprocessor (e.g., to perform or control performance of one or more operations), a field-programmable gate array (FPGA), or an application-specific integrated circuit (ASIC). Alternatively, in some embodiments, the ML model may be implemented using a combination of hardware and software. Examples of the ML model may include a neural network model, a linear regression model, a logistic regression model, a decision tree model, a support vector machine model, a Naïve Bayes classifier model, a k-nearest neighbor model, or a random forest model.

For example, the multi-class classifier model 114 may be a classification model that may be configured to classify an input NL descriptor and/or a corresponding PL code into a semantic code class associated with the PL code. Based on an input NL descriptor, the multi-class classifier model 114 may be configured to predict a semantic code class that may be associated with a PL code corresponding to the input NL descriptor. In an example, each of the set of intra-class predictor models 116 may be one of a regression model or a classification model that be configured determine a similarity score between an input NL descriptor and each PL code associated with the semantic code class associated with the corresponding intra-class predictor model. Based on the determined similarity score, the intra-class predictor model may be configured to predict a PL code that may correspond to the input NL descriptor.

Modifications, additions, or omissions may be made to the network environment 100 without departing from the scope of the present disclosure. For example, the environment 100 may include more or fewer elements than those illustrated and described in the present disclosure. For instance, in some embodiments, the environment 100 may include the electronic device 102 but not the database 104 and the user device 106. In addition, in some embodiments, the functionality of each of the database 104 and the user device 106 may be incorporated into the electronic device 102, without a deviation from the scope of the disclosure.

Figure 2:
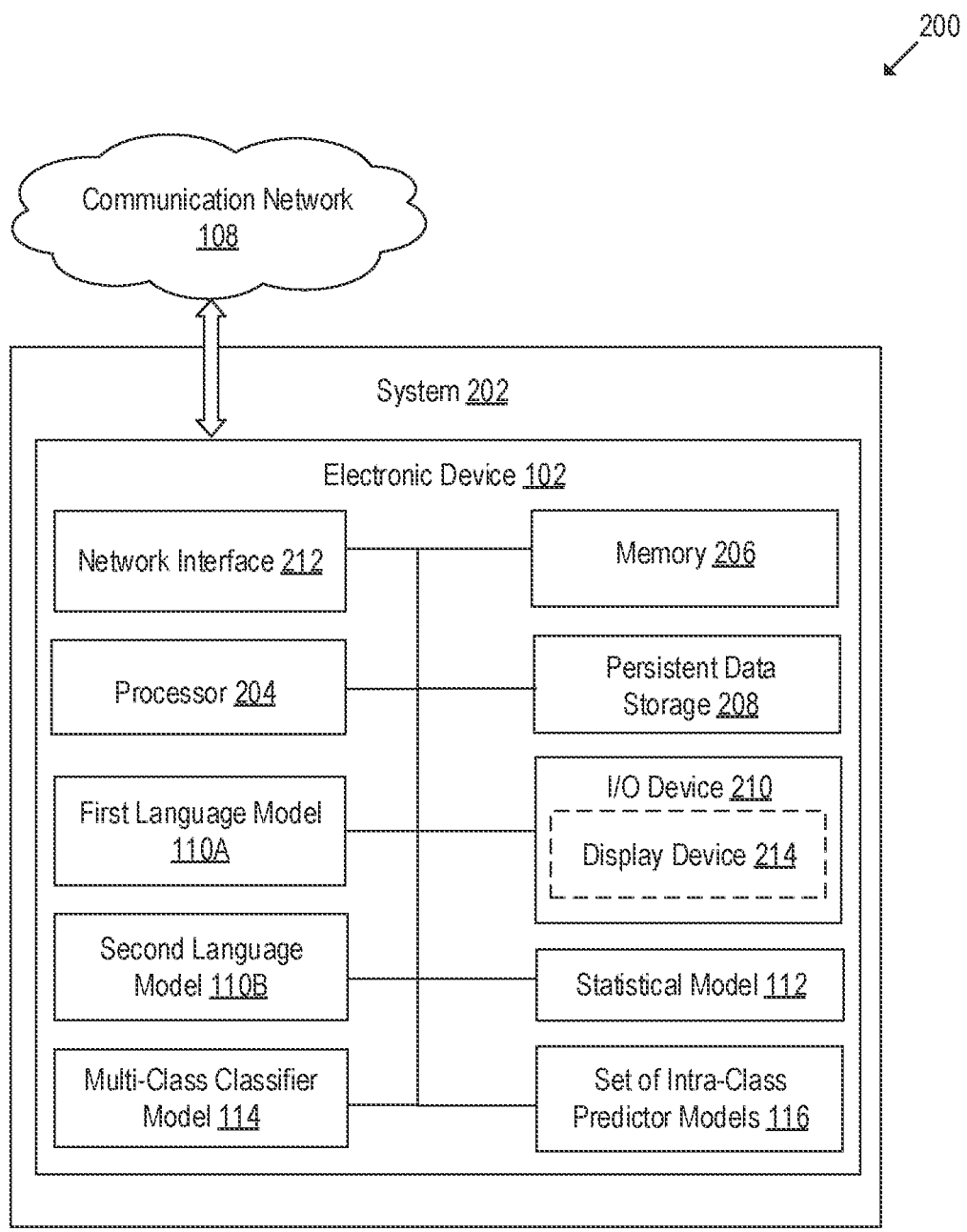
FIG. 2 is a block diagram that illustrates an exemplary electronic device for source code retrieval based on a multi-class classifier model.

FIG. 2 is a block diagram that illustrates an exemplary electronic device for source code retrieval based on a multi-class classifier model, arranged in accordance with at least one embodiment described in the present disclosure. FIG. 2 is explained in conjunction with elements from FIG. 1. With reference to FIG. 2, there is shown a block diagram 200 of a system 202. The system 202 may include the electronic device 102 of FIG. 1. The electronic device 102 may include a processor 204, a memory 206, a persistent data storage 208, an input/output (I/O) device 210, a network interface 212, the first language model 110A, the second language model 110B, the statistical model 112, the multi-class classifier model 114, and the set of intra-class predictor models 116. In at least one embodiment, the I/O device 210 may also include a display device 214.

The processor 204 may include suitable logic, circuitry, and/or interfaces that may be configured to execute program instructions associated with different operations to be executed by the electronic device 102. The operations may include receiving the set of NL descriptors 118 and the corresponding set of PL codes 120. The operations further include determining the first vector associated with each of the set of NL descriptors 118 based on the first language model 110A. The operations further include determining the second vector associated with each of the set of PL codes 120, based on the second language model 110B. The operations may further include determining, using the statistical model 112, the number of a set of semantic code classes to cluster the set of PL codes 120. The operations may further include clustering the set of PL codes 120 into the set of semantic code classes based on the number, the first vector, and the second vector. The operations may further include training the multi-class classifier model 114 to predict a semantic code class, from the set of semantic code classes, corresponding to an input NL descriptor. The operations may further include selecting an intra-class predictor model (from the set of intra-class predictor models 116) based on the predicted semantic code class and training the selected intra-class predictor model to predict a PL code corresponding to the input NL descriptor. The processor 204 may include any suitable special-purpose or general-purpose computer, computing entity, or processing device, including various computer hardware or software modules, and may be configured to execute instructions stored on any applicable computer-readable storage media. For example, the processor 204 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data.

Although illustrated as a single processor in FIG. 2, the processor 204 may include any number of processors configured to, individually or collectively, perform or direct performance of any number of operations of the electronic device 102, as described in the present disclosure. Additionally, one or more of the processors may be present on one or more different electronic devices, such as different servers. In some embodiments, the processor 204 may be configured to interpret and/or execute program instructions and/or process data stored in the memory 206 and/or the persistent data storage 208. In some embodiments, the processor 204 may fetch program instructions from the persistent data storage 208 and load the program instructions in the memory 206. After the program instructions are loaded into memory 206, the processor 204 may execute the program instructions. Some of the examples of the processor 204 may be a Graphical Processing Unit (GPU), a Central Processing Unit (CPU), a Reduced Instruction Set Computer (RISC) processor, an Application-Specific Integrated Circuit (ASIC) processor, a Complex Instruction Set Computer (CISC) processor, a co-processor, and/or a combination thereof.

The memory 206 may include suitable logic, circuitry, and/or interfaces that may be configured to store program instructions executable by the processor 204. The one or more instructions stored in the memory 206 may be executed by the processor 204 to perform the different operations of the processor 204 (and the electronic device 102). In certain embodiments, the memory 206 may be configured to store operating systems and associated application-specific information. The memory 206 may include computer-readable storage media for carrying or having computer-executable instructions or data structures stored thereon. Such computer-readable storage media may include any available media that may be accessed by a general-purpose or special-purpose computer, such as the processor 204.

By way of example, and not limitation, such computer-readable storage media may include tangible or non-transitory computer-readable storage media, including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store particular program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 204 to perform a certain operation or group of operations associated with the electronic device 102.

The persistent data storage 208 may include suitable logic, circuitry, interfaces, and/or code that may be configured to store program instructions executable by the processor 204, operating systems, and/or application-specific information, such as logs and application-specific databases. The persistent data storage 208 may include computer-readable storage media for carrying or having computer-executable instructions or data structures stored thereon. Such computer-readable storage media may include any available media that may be accessed by a general-purpose or special-purpose computer, such as the processor 204.

By way of example, and not limitation, such computer-readable storage media may include tangible or non-transitory computer-readable storage media including Compact Disc Read-Only Memory (CD-ROM) or other optical disk storage, magnetic disk storage or other magnetic storage devices (e.g., Hard-Disk Drive (HDD)), flash memory devices (e.g., Solid State Drive (SSD), Secure Digital (SD) card, other solid state memory devices), or any other storage medium which may be used to carry or store particular program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 204 to perform a certain operation or group of operations associated with the electronic device 102.

In some embodiments, either of the memory 206, the persistent data storage 208, or combination may be configured to store the received set of NL descriptors 118, the corresponding received set of PL codes 120, the first vector associated with each of the set of NL descriptors 118, the second vector associated with each of the set of PL codes 120, and the feature vector associated with each pair of NL descriptor and corresponding PL code. In at least one embodiment, either of the memory 206, the persistent data storage 208, or combination may further store the first language model 110A, the second language model 110B, the statistical model 112, the multi-class classifier model 114, and the set of intra-class predictor models 116.

The I/O device 210 may include suitable logic, circuitry, interfaces, and/or code that may be configured to receive a user input. For example, the I/O device 210 may receive a user input indicative of an instruction to train the multi-class classifier model 114 and the set of intra-class predictor models 116 for source code retrieval from the database 104, at a later time. In another embodiment, the I/O device 210 may receive a user input indicative of a queried NL descriptor. The I/O device 210 may be further configured to provide an output in response to the user input. For example, the I/O device 210 may provide an output of a PL code associated with the queried NL descriptor, in response to the receipt of the queried NL descriptor. The I/O device 210 may include various input and output devices, which may be configured to communicate with the processor 204 and other components, such as the network interface 212. Examples of the input devices may include, but are not limited to, a touch screen, a keyboard, a mouse, a joystick, and/or a microphone. Examples of the output devices may include, but are not limited to, a display device and a speaker.

The I/O device 210 may include the display device 214. The display device 214 may include suitable logic, circuitry, and interfaces that may be configured to render, on a display screen, an output PL code corresponding to a queried NL descriptor. The display screen may be a touch screen which may enable the participant 124 to provide a touch-input or a gesture-input via the display device 214 or the display screen. The touch screen may be at least one of a resistive touch screen, a capacitive touch screen, or a thermal touch screen. The display device 214 or the display screen may be realized through several known technologies such as, but not limited to, at least one of a Liquid Crystal Display (LCD) display, a Light Emitting Diode (LED) display, a plasma display, or an Organic LED (OLED) display technology, or other display devices.

The network interface 212 may include suitable logic, circuitry, interfaces, and/or code that may be configured to establish a communication between the system 202 (i.e., the electronic device 102), and one or more of the database 104 or the user device 106, via the communication network 108. The network interface 212 may be implemented by use of various known technologies to support wired or wireless communication of the electronic device 102, via the communication network 108. The network interface 212 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, and/or a local buffer.

The network interface 212 may communicate via wireless communication with networks, such as the Internet, an Intranet and/or a wireless network, such as a cellular telephone network, a wireless local area network (LAN) and/or a metropolitan area network (MAN). The wireless communication may use any of a plurality of communication standards, protocols and technologies, such as Global System for Mobile Communications (GSM), Enhanced Data GSM Environment (EDGE), wideband code division multiple access (W-CDMA), Long Term Evolution (LTE), LTE-Advanced, $5^{th}$ Generation (5G) New Radio (NR), code division multiple access (CDMA), time division multiple access (TDMA), Bluetooth, Wireless Fidelity (Wi-Fi) (such as IEEE 802.11a, IEEE 802.11b, IEEE 802.11g and/or IEEE 802.11n), voice over Internet Protocol (VoIP), light fidelity (Li-Fi), or Wi-MAX.

Modifications, additions, or omissions may be made to the system 202, without departing from the scope of the present disclosure. For example, in some embodiments, the system 202 may include any number of other components that may not be explicitly illustrated or described.

FIG. 3 is a diagram that illustrates an exemplary scenario for a Natural Language (NL) descriptor and a Programming Language (PL) code, according to at least one embodiment described in the present disclosure. FIG. 3 is explained in conjunction with elements from FIG. 1 and FIG. 2. With reference to FIG. 3, there is shown an exemplary NL descriptor-PL code pair. The NL descriptor-PL code pair may include an NL descriptor 302 and a corresponding PL code 304.

In an embodiment, the processor 204 may be configured to obtain the NL descriptor 302 and the corresponding PL code 304 by splitting a source code in a corpus of source codes. The corpus of source codes may include the set of NL descriptors 118 and the set of PL codes 120. The corpus of source codes may be obtained from a data repository, a server, an open-source software, and the like. Similarly, the processor 204 may be configured to split other source codes to obtain other NL descriptor-PL code pairs in the set of NL descriptors 118 and the set of PL codes 120. In accordance with an embodiment, the processor 204 may store the obtained set of NL descriptors 118 and the set of PL codes 120 in the database 104.

The NL descriptor 302 may include one or more docstrings associated with the source code, which may include, but is not limited to, a description of one or more variables used in the PL code 304, a description of one or more function calls in the PL code 304, or a description of function parameters in the PL code 304. The NL descriptor 302 may be associated with a NL grammar. The PL code 304 may include the lines of code in a specific programming language used in the source code, or comments relevant to one or more lines of code. The PL code 304 may be associated with a PL grammar. The processor 204 may be further configured to apply the first language model 110A on the NL descriptor 302 to determine a first vector associated with the NL descriptor 302. Similarly, the processor 204 may apply the second language model 110B on the PL code 304 to determine a second vector associated with the PL code 304.

It should be noted that the NL descriptor 302 and the PL code 304 of FIG. 3 are for exemplary purposes and should not be construed to limit the scope of the disclosure.

Figure 4:
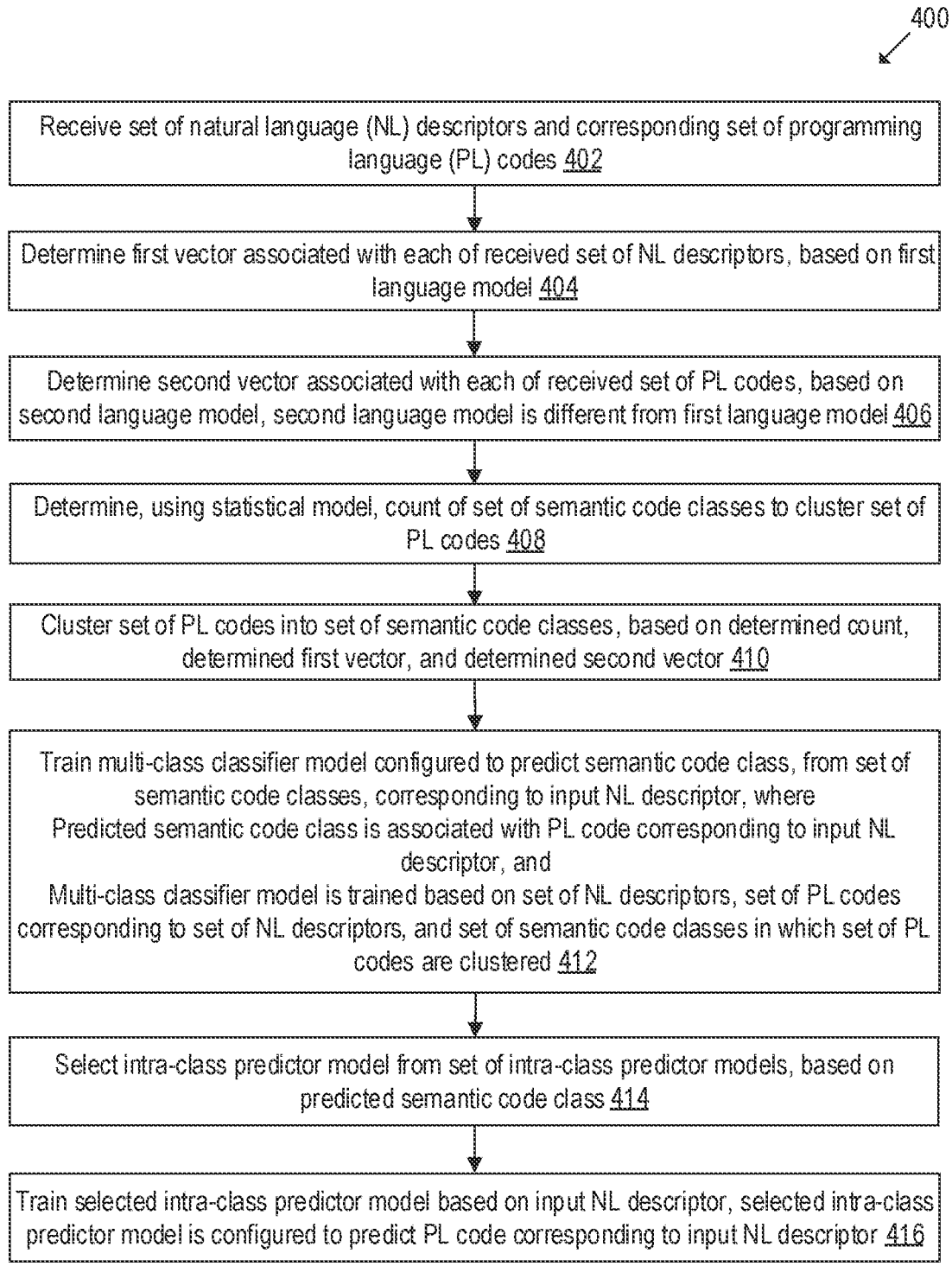
FIG. 4 illustrates a flowchart of an example method for a retrieval of a source codes based on a multi-class classifier.

FIG. 4 illustrates a flowchart of an example method for a retrieval of a source codes based on a multi-class classifier, according to at least one embodiment described in the present disclosure. FIG. 4 is explained in conjunction with elements from FIG. 1, FIG. 2, and FIG. 3. With reference to FIG. 4, there is shown a flowchart 400. The method illustrated in the flowchart 400 may start at 402 and may be performed by any suitable system, apparatus, or device, such as by the electronic device 102 of FIG. 1 or the system 202 of FIG. 2. Although illustrated with discrete blocks, the steps and operations associated with one or more of the blocks of the flowchart 400 may be divided into additional blocks, combined into fewer blocks, or eliminated, depending on the particular implementation.

At block 402, a set of NL descriptors and a corresponding set of PL codes may be received. The processor 204 may be configured to receive the set of NL descriptors 118 and the corresponding set of PL codes 120. For example, a corpus of source codes, including 'N' source codes (comprising 'N' NL descriptors and 'N' corresponding PL codes), may be received. Each source code may include an NL descriptor and a corresponding PL code. Each of the 'N' NL descriptors in the 'N' source codes may correspond to the respective 'N' PL codes. The received set of NL descriptors 118 may include, for example, the first NL descriptor 118A, the second NL descriptor 118B, . . . , and the $N^{th}$ NL descriptor 118N. Similarly, the received set of PL codes 120 may include, for example, the first PL code 120A, the second PL code 120B, . . . and the $N^{th}$ PL code 120N as shown, for example, in FIG. 1. In accordance with an embodiment, processor 204 may receive the set of NL descriptors 118 and the set of PL codes 120 from the device hosting the database 104, via the communication network 108. The processor 204 may store the received set of NL descriptors 118 and the received set of PL codes 120 in the memory 206. In an alternate embodiment, the set of NL descriptors 118 and the set of PL codes 120 may be pre-stored in the memory 206. In such case, the processor 204 may retrieve the set of NL descriptors 118 and the set of PL codes 120 from the memory 206. An example of an NL descriptor and a corresponding PL code is provided, for example, in FIG. 3.

At block 404, a first vector associated with each of the received set of NL descriptors 118 may be determined based on the first language model 110A. The processor 204 may be configured to determine the first vector associated with each of the received set of NL descriptors 118, based on the first language model 110A. The processor 204 may determine 'N' first vectors associated with the first NL descriptor 118A, the second NL descriptor 118B, . . . , and the $N^{th}$ NL descriptor 118N, respectively. The first vector associated with the first NL descriptor 118A may be a numerical representation of the first NL descriptor 118A. Similarly, the first vectors associated with the second NL descriptor 118B, . . . and the $N^{th}$ NL descriptor 118N may be numerical representations of the second NL descriptor 118B, . . . and the $N^{th}$ NL descriptor 118N respectively. The first language model 110A may embed each of the 'N' NL descriptors in the set of NL descriptors 118 as 'N' first vectors based on one or more factors. In accordance with an embodiment, the one or more factors may include NL grammar and semantic words. The first language model 110A may determine the first vector associated with each of the received set of NL descriptors 118 based on the NL grammar and the semantic words in each of the received set of NL descriptors 118. Examples of the first language model 110A may include, but are not limited to, a BERT language model, a GPT-2 language model, a GPT-3 language model, or a DNN-based NLP model. The determination of the first vector associated with each of the received set of NL descriptors is described further, for example, in FIG. 5.

At block 406, a second vector associated with each of the received set of PL codes 120 may be determined based on the second language model 110B. The processor 204 may be configured to determine the second vector associated with each of the received set of set of PL codes 120, based on the second language model 110B. The processor 204 may determine 'N' second vectors associated with the first PL code 120A, the PL code 120B, . . . and the $N^{th}$ PL code 120N, respectively. The second vector associated with the first PL code 120A may be a numerical representation of the first PL code 120A. Similarly, the second vectors associated with the second PL code 120B, . . . and the $N^{th}$ PL code 120N are numerical representations of the second PL code 120B, . . . and the $N^{th}$ PL code 120N respectively. The second language model 110B may embed each of the 'N' PL codes in the set of PL codes 120 as 'N' second vectors based on one or more factors. In accordance with an embodiment, the second language model 110B may determine the second vector associated with each of the received set of PL codes 120 based on the one or more factors such as PL code grammar used in each PL code of the received set of PL codes 120, abstract syntax tree (AST) representations associated with the PL code grammar, and a type of code used in each PL code of the received set of PL codes 120.

For example, U.S. patent application Ser. No. 17/116,956 filed on Dec. 9, 2020, entitled "PROGRAMMING LANGUAGE CORPUS GENERATION", which is incorporated by reference herein in its entirety, discusses construction of augmented programming packages in detail. In another example, U.S. patent application Ser. No. 17/161,545 filed on Jan. 28, 2021, entitled "SEMANTIC CODE SEARCH BASED ON AUGMENTED PROGRAMMING LANGUAGE CORPUS," which is incorporated by reference herein in its entirety, discusses learning of semantic code search models in detail. It may be noted that methods to construct augmented programming packages and/or learn semantic code search models by the referenced applications are merely examples. Although, there may be different other ways to search a code through a large number of code records using language models (such as, the second language model 110B), without departure from the scope of the disclosure.

Examples of the second language model 110B may include, but are not limited to, an Augmented-Code (AugCode) language model, a Code-BERT language model, or a Code-GPT language model. The determination of the second vector associated with each of the received set of PL codes is described further, for example, in FIG. 5.

At block 408, the number of a set of semantic code classes, to cluster the set of PL codes 120, may be determined using the statistical model 112. The processor 204 may be configured to determine, using the statistical model 112, the number of the set of semantic code classes to cluster the set of PL codes 120. For example, if the number is determined as 'k', each of the 'N' PL codes (comprising the set of PL codes 120) may be clustered in one of the 'k' semantic code classes (comprising the set of semantic code classes). Thus, each semantic class of the 'k' semantic code classes may represent a cluster. Therefore, once a semantic class (of the 'k' semantic code classes) is determined, a code search process may involve searching a source code in one of the 'k' semantic code classes instead of searching for the source code in the corpus of source code (comprising the 'N' source codes). Each semantic class of the 'k' semantic code classes may correspond to one or more of, but not limited to, an AST representation associated with a PL code grammar, a NL language grammar associated with an NL code descriptor, a set of synonymous words and codes, a code similarity metrics, and a set of semantically equivalent words and codes. For example, the AST representation associated with the PL code grammar may be used to decompose a source code into different sections of the PL code, such as, but not limited to, classes, functions, parameters, input parameters, outputs, user comments, or docstrings (i.e., code descriptions or NL descriptors).

Examples of the statistical model 112 that may be used by the processor 204 to determine the number of the semantic code classes may include a gap statistical model, an average silhouette statistical model, or an elbow statistical model. For example, in the gap statistical model, the number (for example, 'k') may be determined as the smallest value of 'i', based on equations (1), (2), (3), (4), and (5), as follows:

$$\text{Gap}(i) \geq \text{Gap}(i+1) - s_i + 1 \qquad (1)$$

$$\text{Gap}(i) = \frac{1}{B}\sum_{b=1}^{B} \log(W_{*_{Ib}}) - \log(W_I) \qquad (2)$$

where 'I' (i=1, 2, 3 . . . I) may represent the maximum value of the number, and $W_i$ may represent a total within cluster (or intra-cluster) variation between feature vectors associated with PL codes (of the set of PL codes 120) associated with a selected semantic code class 'i'.

$$W_I = \sum_{r=1}^{i} \frac{1}{2n_i} D_i \qquad (3)$$

where '$n_i$' may represent a number of PL codes in a cluster (i.e., a semantic code class) 'r' (wherein, r=1 . . . i), '$D_i$' may represent a sum of pairwise distances between all feature vectors associated with PL codes (of the set of PL codes 120) associated with a semantic code class 'r', $\log(W_{1*b})$ may represent an expectation of $\log(W_i)$, i.e., $E[\log(W_i)]$, and 'B' may represent a number of copies of the PL codes, associated with the semantic code class 'i', that may be generated to compute $E[\log(W_i)]$, where B=1 . . . b.

$$s_i = sd_i * \sqrt{1 + \frac{1}{B}} \qquad (4)$$

where, '$s_i$' may represent an error that may be incurred during the computation of $E[\log(W_i)]$.

$$sd_i = \sqrt{\frac{1}{b}\sum_{b=1}^{B}\log(W_{*_{Ib}}) - \frac{1}{B}\sum\log(W_{*_{Ib}})} \qquad (5)$$

where, $sd_i$ may represent a standard deviation of 'B' copies of log ($W_{*b}$).

In accordance with an embodiment, the processor 204 may be configured to concatenate the first vector associated with each NL descriptor of the set of NL descriptors 118 and the second vector associated with corresponding PL code of the set of PL codes 120 to determine a feature vector associated with each pair of an NL descriptor and a corresponding PL code. The processor 204 may determine 'N' feature vectors associated with each pair of NL descriptor (of the set of NL descriptors 118) and the corresponding PL code (of the set of PL codes 120). For example, the first feature vector associated with the pair of the first NL descriptor 118A and the corresponding first PL code 120A may be determined based on a concatenation of the first vector associated with the first NL descriptor 118A and the second vector associated with the corresponding first PL code 120A. Similarly, a second feature vector may be determined based on a concatenation of the first vector associated with the second NL descriptor 118B and the second vector associated with the corresponding second PL code 120B. The determination of the feature vector associated with each pair of an NL descriptor and a corresponding PL code is described further, for example, in FIG. 6.

At block 410, the set of PL codes 120 may be clustered into the set of semantic code classes, based on the determined number, the determined first vector, and the determined second vector. The processor 204 may be configured to cluster the set of PL codes 120 into the set of semantic code classes, based on the determined number, the determined first vector, and the determined second vector. In accordance with an embodiment, the set of PL codes may be clustered into the set of semantic code classes using a k-means clustering technique. The processor 204 may determine similarities between the feature vectors associated with each pair of NL descriptors and corresponding PL codes. As each feature vector associated with a pair of an NL descriptor and a corresponding PL code may be determined based on the first vector associated with the NL descriptor and the second vector associated with the PL code, the clustering of the set of PL codes into the set of semantic code classes may be based on both the first language model 110A and the second language model 110B.

The PL codes (of the set of PL codes 120) that may have similar AST representations may be clustered in the same semantic code class (of the set of semantic code classes). The AST representations may be associated with a PL grammar. The different PL codes clustered in each semantic class may include synonymous codes, may be associated with a similar PL grammar, or may be semantically equivalent to each other. The NL descriptors that correspond to the PL codes in each semantic class may be associated with an NL grammar. The different NL descriptors may include synonymous or equivalent words. For example, PL codes associated with a data science domain may be clustered in a first semantic class of the 'k' semantic code classes. For example, the first semantic class may include classes and functions of 'pandas' library of "python" programming language. Therefore, AST representations of the PL codes clustered in the first semantic class may be similar, for example, in terms of a PL grammar. Similarly, PL codes used in web server applications may be clustered in a second semantic class of the 'k' semantic code classes. For example, the second semantic class may include classes and functions associated with 'Django' platform library of "python" programming language. Therefore, AST representations of the PL codes clustered in the second semantic class may be similar, for example, in terms of a PL grammar.

In an example, the k-means clustering technique may minimize a within-cluster sum of squares of each feature vector 'X' to optimize the clustering of the PL codes of the set of PL codes 120, based on an optimization function, such as, $$\operatorname*{argmin}_{C} \sum\nolimits_{k=1}^{k} x \in C_i \|X - \mu_i\|^2.$$

Herein, $C_i$ may represent an $i^{th}$ semantic code class cluster, from the k clusters, and $\mu_i$ may represent a mean of the $i^{th}$ semantic code class cluster. In accordance with an embodiment, k=Gap(i), as determined by the statistical model 112. The PL codes of the set of PL codes 120 may be clustered in each semantic code classes based on:

$$\operatorname*{argmin}_{C} \sum\nolimits_{k=1}^{k} \sum\nolimits_{j=1}^{m} Vec(NL_j) \cup Vec(PL_j) \in C_i \|Vec - \mu_i\|^2.$$

Here, $Vec(NL_j)$ may represent the first vector associated with a '$j^{th}$' NL descriptor clustered in an '$i^{th}$' semantic code class, $Vec(PL_j)$ may represent the second vector associated with a '$j^{th}$' PL code clustered in an '$i^{th}$' semantic code class, and 'Vec' may represent the feature vector obtained based on the concatenation of the '$j^{th}$' NL descriptor and the '$j^{th}$' PL code, and $\mu_i$ is a mean of the '$i^{th}$' semantic code class cluster.

The clustering of the set of PL codes 120 into the set of semantic code classes may lead to a significant reduction in a time required for search code retrieval. The disclosed search code retrieval process may be significantly faster and more efficient than conventional solutions as the disclosed search code retrieval process may involve a determination of a semantic code class relevant to a queried NL descriptor and a subsequent search of an appropriate PL code within the relevant semantic code class. Thus, the conventional process of code search through millions of codes may reduce to a search through a significantly less number (e.g., a few tens) of semantic code classes, and a subsequent search through a manageable number (e.g., a few thousands) of PL codes in the determined semantic code class, in case of the disclosed process. Therefore, the overall time, complexity, and computational resources required for the source code retrieval process may be reduced by a large factor.

At block 412, the multi-class classifier model 114 may be trained. The multi-class classifier model 114 may be configured to predict a semantic code class, from the set of semantic code classes, corresponding to an input NL descriptor. In accordance with an embodiment, the processor 204 may be configured to train the multi-class classifier model 114 to predict the semantic code class, from the set of semantic code classes, corresponding to the input NL descriptor. The predicted semantic code class may be associated with a PL code corresponding to the input NL descriptor. The multi-class classifier model 114 may be trained based on the set of NL descriptors 118, the set of PL codes 120 corresponding to the set of NL descriptors, 118 and the set of semantic code classes in which the set of PL codes 120 may be clustered. The set of NL descriptors 118 and the set of PL codes 120 may be part of a training dataset to be used for training the multi-class classifier model 114. Each of the NL descriptors (for example, the first NL descriptor 118A, the second NL descriptor 118B, . . . and the $N^{th}$ NL descriptor 118N) of the set of NL descriptors 118 and each of the corresponding PL codes (for example, the first PL code 120A, the second PL code 120B, . . . and the $N^{th}$ PL code 120N) of the set of PL codes 120 may be used for generation of a set of positive examples and a set of negative examples. Each NL descriptor-PL code pair in the set of positive examples may be associated with a semantic code class that may be same as an actual semantic code class in which the PL code of the NL descriptor-PL code pair may be clustered. Each NL descriptor-PL code pair in the set of negative examples may be associated with a semantic code class that may be different from an actual semantic code class in which the PL code of the NL descriptor-PL code pair may be clustered.

The processor 204 may categorize one or more subsets of the set of positive examples and one or more subsets of the set of negative examples as training data, validation data, and test data to train the multi-class classifier model 114. The second language model 110B may be applied on one or more subsets of the generated set of positive examples and one or more subsets of the generated set of negative examples (such as, the training data and validation data) to determine a first subset of the set of semantic code classes. The multi-class classifier model 114 may be applied on a subset of the generated set of positive examples (e.g., the test data) to determine a second subset of the set of semantic code classes. The processor 204 may be further configured to train the multi-class classifier model 114 to predict the semantic code class corresponding to the input NL descriptor based on the generated set of positive examples, the generated set of negative examples, the first subset and the second subset of the set of semantic code classes. Details about the training of the multi-class classifier model 114 are described, for example, in FIG. 7.

At block 414, an intra-class predictor model may be selected from the set of intra-class predictor models 116, based on the predicted semantic code class. In accordance with an embodiment, the processor 204 may be configured to select an intra-class predictor model from the set of intra-class predictor models 116, based on the predicted semantic code class. Each intra-class predictor model, of the set of intra-class predictor models 116, may be associated with a semantic code class of the set of semantic code classes. The selected intra-class predictor model may be associated with the same semantic code class that may be predicted for the input NL descriptor, using the multi-class classifier model 114.

At block 416, the selected intra-class predictor model may be trained based on the input NL descriptor. The processor 204 may be configured to train the selected intra-class predictor model based on the input NL descriptor. The selected intra-class predictor model may be configured to predict the PL code corresponding to the input NL descriptor. The predicted PL code may be associated with the predicted semantic code class corresponding to the input NL descriptor. In accordance with an embodiment, the processor 204 may determine a set of NL descriptor-PL code pairs based on the input NL descriptor and PL codes associated with the predicted semantic code class. The selected intra-class predictor model may be applied on each of the determined set of NL descriptor-PL code pairs. The processor 204 may determine a similarity score between the input NL descriptor and each PL code, of the set of PL codes, associated with the predicted semantic code class. The processor 204 may be trained to predict a PL code associated with the predicted semantic code class based on the determined similarity score. Details about the training of the intra-class predictor model are described, for example, in FIG. 8. Control may pass to end.

Although the flowchart 400 is illustrated as discrete operations, such as 402, 404, 406, 408, 410, 412, 414, and 416. However, in certain embodiments, such discrete operations may be further divided into additional operations, combined into fewer operations, or eliminated, depending on the particular implementation without detracting from the essence of the disclosed embodiments.

Figure 5:
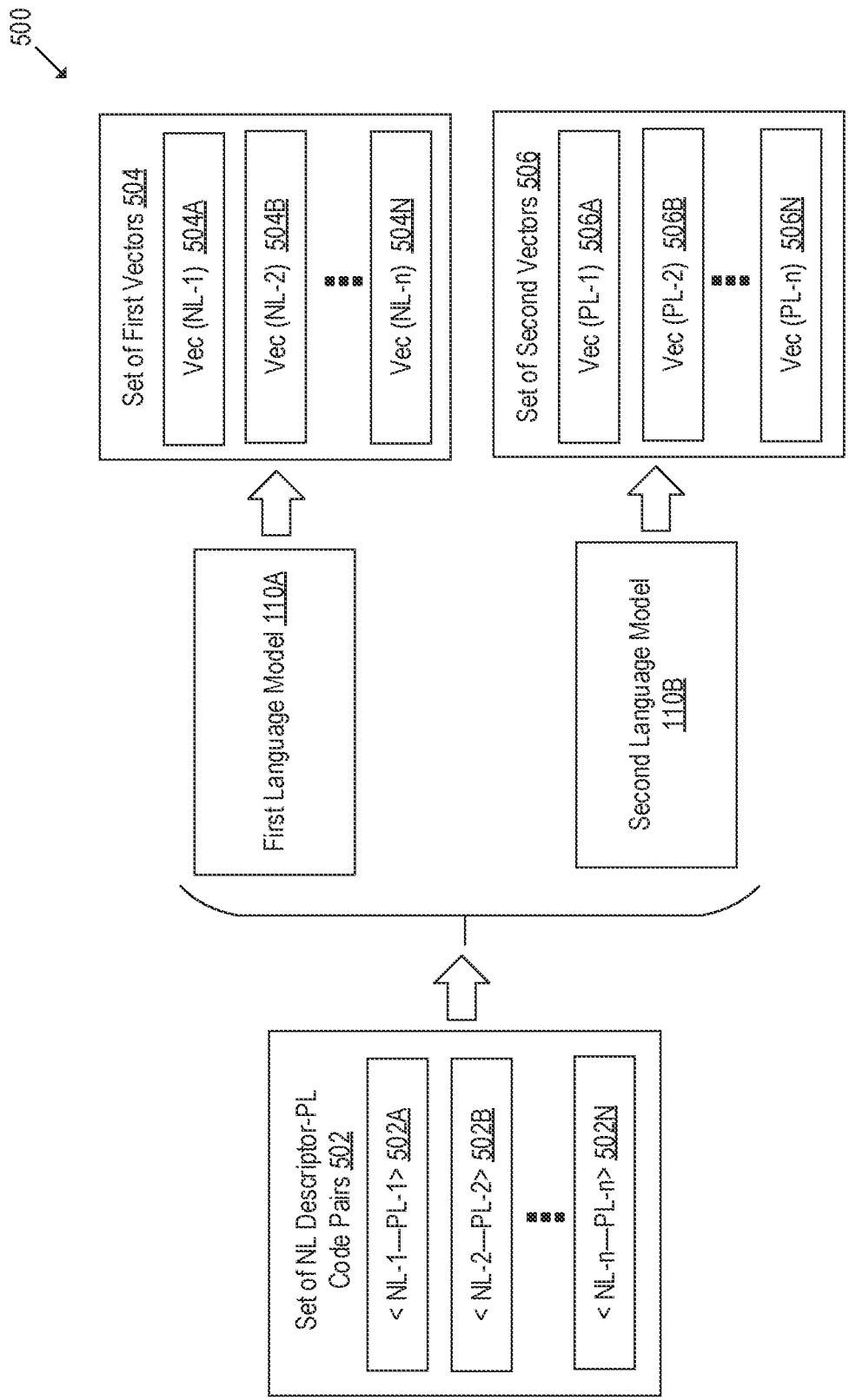
FIG. 5 is a diagram that illustrates an exemplary scenario for determination of vectors associated with NL descriptors and corresponding PL codes using language models.

FIG. 5 is a diagram that illustrates an exemplary scenario for determination of vectors associated with NL descriptors and corresponding PL codes using language models, according to at least one embodiment described in the present disclosure. FIG. 5 is explained in conjunction with elements from FIG. 1, FIG. 2, FIG. 3, and FIG. 4. With reference to FIG. 5, there is shown an exemplary scenario 500. The scenario 500 includes one or more components of FIG. 1, such as, the first language model 110A and the second language model 110B. There is further shown a set of NL descriptor-PL code pairs 502 (also referred herein as a set of NL-PL pairs 502), a set of first vectors 504, and a set of second vectors 506. The set of NL descriptor-PL code pairs 502 includes the set of NL descriptors 118 and the corresponding set of PL codes 120. For example, a first NL-PL pair of the first NL descriptor 118A and the corresponding first PL code 120A may be represented as NL-1-PL-1 502A. Similarly, a second NL-PL pair of the second NL descriptor 118B and the corresponding second PL code 120B may be represented as NL-2-PL-2 502B, . . . and an $N^{th}$ NL-PL pair of the $N^{th}$ NL descriptor 118N and the corresponding $N^{th}$ PL code 120N may be represented as NL-n-PL-n 502N.

The processor 204 may be configured to determine the set of first vectors 504 associated with the set of NL descriptors 118 of the set of NL descriptor-PL code pairs 502, based on the first language model 110A as described, for example, at 404 in FIG. 4. The processor 204 may determine the set of first vectors 504 such as, a Vec (NL-1) 504A, a Vec (NL-2) 504B, . . . and a Vec (NL-n) 504N. The Vec (NL-1) 504A may be associated with the first NL descriptor 118A, the Vec (NL-2) 504B may be associated with the second NL descriptor 118B, . . . and the Vec (NL-n) 504N may be associated with the $N^{th}$ NL descriptor 118N. The first language model 110A may embed each NL descriptor (i.e., the NL-1, NL-2, . . . and NL-n) of the set of NL descriptors 118 into the set of first vectors 504 based on NL grammar and NL words in each of the NL descriptors.

The processor 204 may be configured to determine the set of second vectors 506 associated with the set of PL codes 120 of the set of NL descriptor-PL code pairs 502, based on the second language model 110B as described, for example, at 406 in FIG. 4. The processor 204 may determine the set of second vectors 506 such as, a Vec (PL-1) 506A, a Vec (PL-2) 506B, . . . and a Vec (PL-n) 506N. The Vec (PL-1) 506A may be associated with the first PL code 120A, the Vec (PL-2) 506B may be associated with the second PL code 120B, . . . and the Vec (PL-n) 506N may be associated with the $N^{th}$ PL code 10N. The second language model 110B may embed each of the PL codes (i.e., the PL-1, PL-2, . . . , and PL-n) of the set of PL codes 120 into the set of second vectors 506 based on a PL code grammar, AST representations of the PL codes, and code types in each of the PL codes.

It should be noted that the scenario 500 of FIG. 5 is for exemplary purposes and should not be construed to limit the scope of the disclosure.

Figure 6:
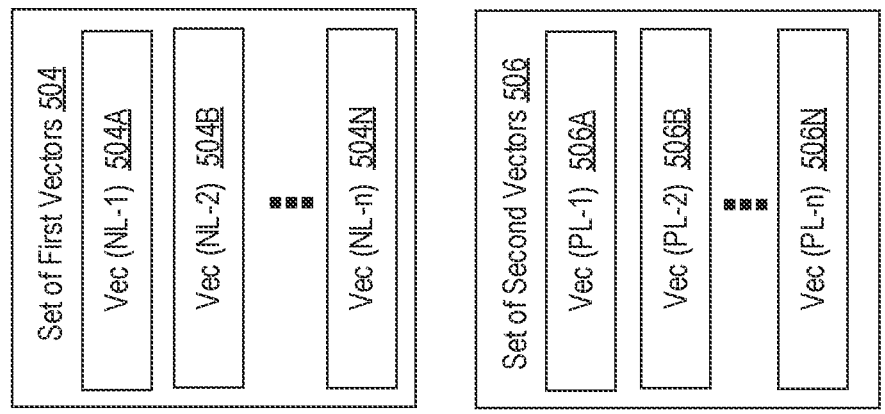
FIG. 6 is a diagram that illustrates an exemplary scenario for determination of feature vectors associated with NL descriptors and corresponding PL codes.

FIG. 6 is a diagram that illustrates an exemplary scenario for determination of feature vectors associated with NL descriptors and corresponding PL codes, according to at least one embodiment described in the present disclosure. FIG. 6 is explained in conjunction with elements from FIG. 1, FIG. 2, FIG. 3, FIG. 4, and FIG. 5. With reference to FIG. 6, there is shown an exemplary scenario 600. The scenario 600, includes elements of FIG. 5, such as, the set of first vectors 504 and the set of second vectors 506. There is further shown, 'N' feature vectors, such as, X1, X2, . . . and Xn, which may be determined based on a concatenation of each first vector of the set of first vectors 504 and each corresponding second vector of the set of second vectors 506.

In accordance with an embodiment, the processor 204 may be configured to concatenate each first vector of the set of first vectors 504 and each corresponding second vector of the set of second vectors 506 to determine feature vectors associated with associated with each pair of NL descriptor and corresponding PL code. For example, the first vector (such as, the Vec (NL-1) 504A) associated with the first NL descriptor 118A may be concatenated with the second vector (such as, the Vec (PL-1) 506A) associated with the first PL code 120A to determine the first feature vector X1. Similarly, the first vector (such as, the Vec (NL-2) 504B) associated with the second NL descriptor 118B may be concatenated with the second vector (such as, the Vec (PL-2) 506B) associated with the second PL code 120B to determine the second feature vector X2, and so on. In an example, the concatenation of each first vector of the set of first vectors 504 and each corresponding second vector of the set of second vectors 506 may be based on a dot product of the respective first vector and the corresponding second vector to determine the feature vectors. For example, the first feature vector (i.e., X1) may be determined based on the dot product of the first vector (such as, the Vec (NL-1) 504A) associated with the first NL descriptor 118A with respect to the second vector (such as, the Vec (PL-1) 506A) associated with the first PL code 120A. That is, X1=Vec(NL-1).Vec (PL-1). The set of PL codes 120 may be clustered into the set of semantic code classes based on the determined feature vector associated with each pair of NL descriptor and the corresponding PL code.

It should be noted that the scenario 600 of FIG. 6 is for exemplary purposes and should not be construed to limit the scope of the disclosure.

Figure 7:
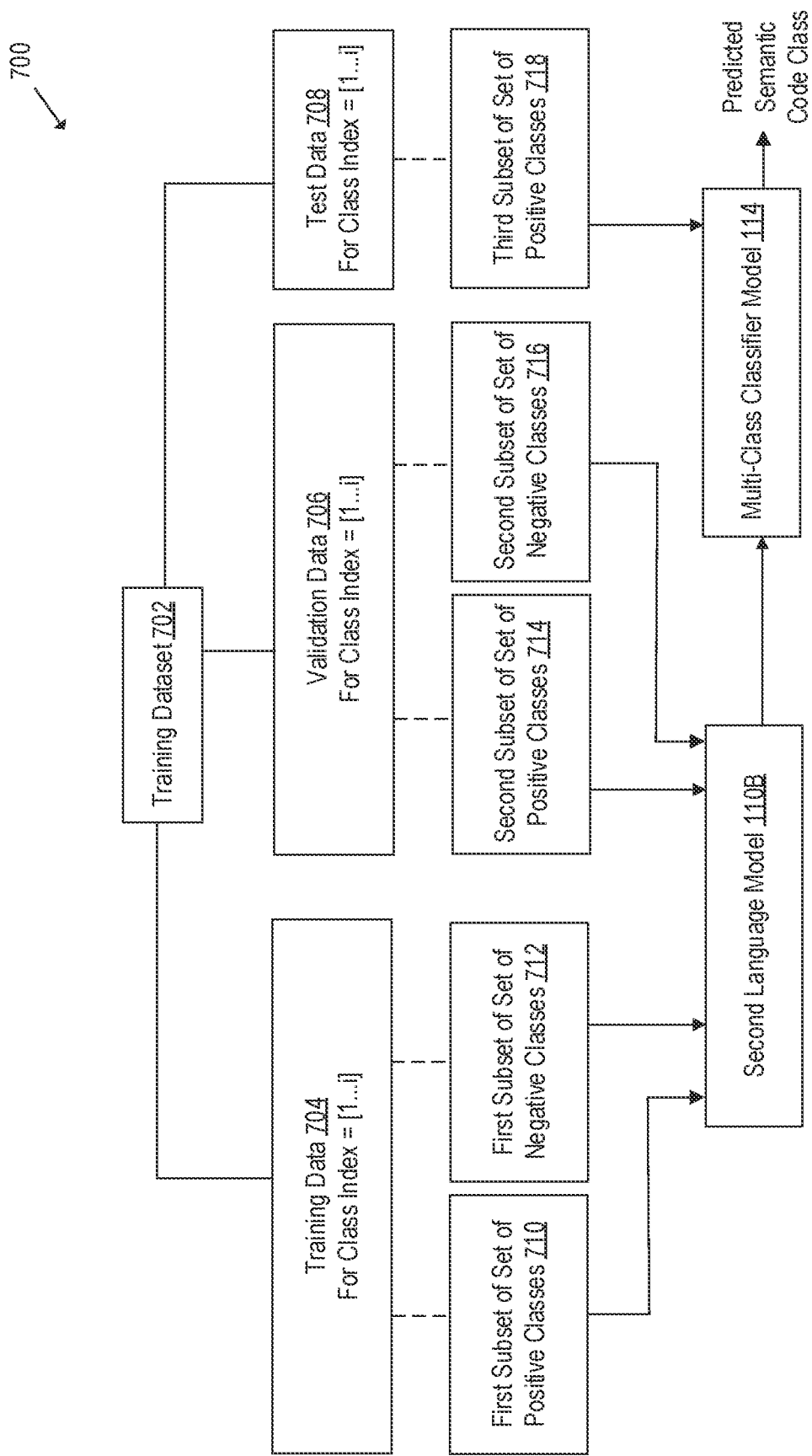
FIG. 7 is a diagram that illustrates an exemplary scenario for training of a multi-class classifier model based on a dataset of NL descriptors and corresponding PL codes.

FIG. 7 is a diagram that illustrates an exemplary scenario for training of a multi-class classifier model based on a dataset of NL descriptors and corresponding PL codes, according to at least one embodiment described in the present disclosure. FIG. 7 is explained in conjunction with elements from FIG. 1, FIG. 2, FIG. 3, FIG. 4, FIG. 5, and FIG. 6. With reference to FIG. 7, there is shown an exemplary scenario 700. The scenario 700 includes elements of FIG. 1, such as, the second language model 110B and the multi-class classifier model 114. There is further shown a training dataset 702 that may be used to train the multi-class classifier model 114. The processor 204 may be configured to train the multi-class classifier model 114 to predict a semantic code class, from the set of semantic code classes, corresponding to an input NL descriptor. The predicted semantic code class may be associated with a PL code corresponding to the input NL descriptor.

The training dataset 702 may include the set of NL descriptors 118 and the corresponding set of PL codes 120. The training dataset 702 may be categorized into training data 704, validation data 706, and test data 708. In accordance with an embodiment, three subsets of a set of positive examples may be generated from the training data 704, the validation data 706, and the test data 708; and two subsets of a set of negative examples may be generated from the training data 704 and the validation data 706.

The processor 204 may be configured to generate the set of positive examples using a first group of NL descriptor-PL code pairs from the set of NL descriptor-PL code pairs 502. Each of the set of positive examples of an NL descriptor-PL code pair in the first group may be generated based on an association of the NL descriptor-PL code pair with a semantic code class in which the corresponding PL code may be clustered (via k-means clustering). In other words, the NL descriptor-PL code pair of each of the set of positive examples may be associated with an actual or correct semantic code class, which may correspond to the PL code of the example. A first subset of the set of positive examples 710 may be part of the training data 704, a second subset of the set of positive examples 714 may be part of the validation data 706, and a third subset of the set of positive examples 718 may be part of the test data 708.

The processor 204 may be further configured to generate the set of negative examples using a second group of NL descriptor-PL code pairs from the set of NL descriptor-PL code pairs 502. The set of NL descriptor-PL code pairs 502 may include the first group of NL descriptor-PL code pairs and the second group of NL descriptor-PL code pairs. Each of the set of negative examples of an NL descriptor-PL code pair in the second group may be generated based on an association of the NL descriptor-PL code pair with a semantic code class that may be different from a semantic code class in which the corresponding PL code have be clustered (via k-means clustering). In other words, the NL descriptor-PL code pair of each of the set of negative examples may be associated with an incorrect semantic code class, which may be different from the actual or correct semantic code class corresponding to the PL code of the example. A first subset of the set of negative examples 712 may be part of the training data 704 and a second subset of the set of negative examples 716 may be part of the validation data 706.

The processor 204 may be further configured to apply the second language model 110B on one or more subsets of the generated set of positive examples and one or more subsets of the generated set of negative examples to determine a first subset of the set of semantic code classes. In an embodiment, the second language model 110B may be applied on the training data 704 and on the validation data 706. For example, the second language model 110B may be applied on the first subset of the set of positive examples 710, the second subset of the set of positive examples 714, the first subset of the set of negative examples 712, and the second subset of the set of negative examples 716, to determine a first subset of the set of semantic code classes. The processor 204 may be further configured to apply the multi-class classifier model 114 on a subset of the generated set of positive examples to determine a second subset of the set of semantic code classes. For example, the multi-class classifier model 114 may be applied on the third subset of the set of positive examples 718.

The processor 204 may be further configured to train the multi-class classifier model 114 to predict the semantic code class corresponding to the input NL descriptor. The training of the multi-class classifier model 114 may be based on the generated set of positive examples, the generated set of negative examples, the determined first subset of semantic code classes, and the determined second subset of semantic code classes. Herein, the generated set of positive examples may include the first subset of the set of positive examples 710, the second subset of the set of positive examples 714, and the third subset of the set of positive examples 718. Further, the generated set of negative examples may include the first subset of the set of negative examples 712 and the second subset of the set of negative examples 716. In an embodiment, the training of the multi-class classifier model 114 may correspond to a fine-tuning of the multi-class classifier model 114, which may be boot-strapped with initial set of semantic code classes, based on the determined number of the set of semantic code classes. The number of the set of semantic code classes may be determined by use of the statistical model 112, as described further, for example, in FIG. 4 (like at 408).

For example, the multi-class classifier model 114 may be an ML model, such as, a classifier model that may be trained to identify a relationship between inputs and output labels. Examples of the inputs may include features in a training dataset (such as, the generated set of positive examples and the generated set of negative examples) and the output labels may include semantic code classes (such as, the first subset and the second subset of semantic code classes). The ML model of the multi-class classifier model 114 may be defined by its hyper-parameters, for example, number of weights, cost function, input size, number of layers, and the like. The parameters of the ML model of the multi-class classifier model 114 may be tuned, and weights may be updated so as to move towards a global minima of a cost function for the ML model. After several epochs of the training on the feature information in the training dataset, the ML model of the multi-class classifier model 114 may be trained to output a classification result for a set of inputs. The classification result may be indicative of a class label for each input of the set of inputs (e.g., a semantic code class for a new/unseen instance of an NL descriptor).

It should be noted that the scenario 700 of FIG. 7 is for exemplary purposes and should not be construed to limit the scope of the disclosure.

Figure 8:
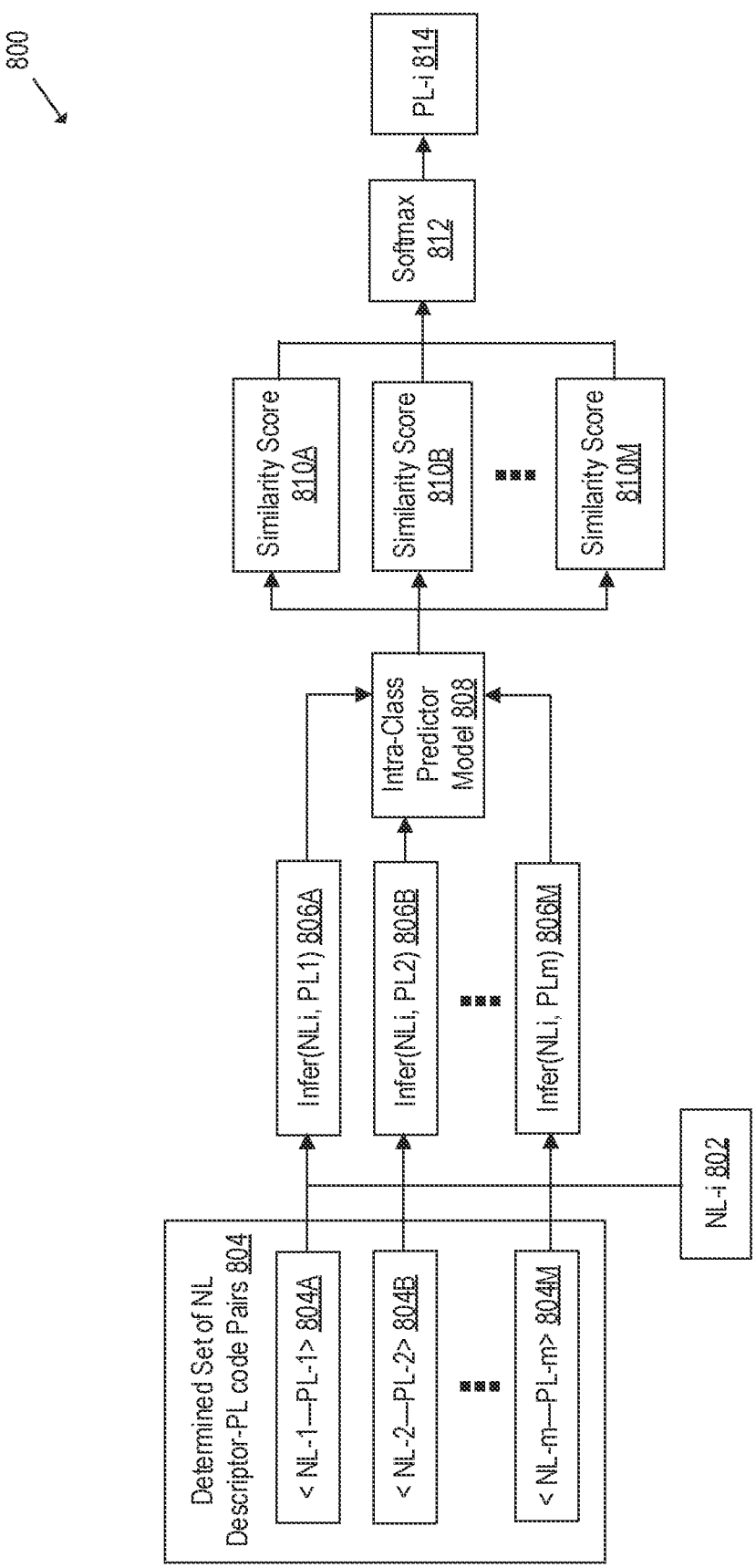
FIG. 8 is a diagram that illustrates an exemplary scenario for training of an intra-class predictor model for prediction of a PL code corresponding to an input NL descriptor.

FIG. 8 is a diagram that illustrates an exemplary scenario for training of an intra-class predictor model for prediction of a PL code corresponding to an input NL descriptor, according to at least one embodiment described in the present disclosure. FIG. 8 is explained in conjunction with elements from FIG. 1, FIG. 2, FIG. 3, FIG. 4, FIG. 5, FIG. 6, and FIG. 7. With reference to FIG. 8, there is shown an exemplary scenario 800. The scenario 800 may include elements of FIG. 1, such as, an intra-class predictor model 808 of the set of intra-class predictor models 116. The intra-class predictor model 808 may be identical to one of the intra-class predictor models, such as, the first intra-class predictor model 116A, the second intra-class predictor model 116B, . . . and the N$^{th}$ intra-class predictor model 116N. The intra-class predictor model 808 may be selected from the set of the intra-class predictor models 116 based on a semantic code class predicted by the multi-class classifier model 114 based on an input NL descriptor (such as, an input NL descriptor, an NL-i 802). In other words, the intra-class predictor model 808 may be a predictor model that may be specific to the predicted semantic code class of the input NL descriptor 802 (i.e., the NL-i 802). The input NL descriptor 802 (i.e., the NL-i 802) may be same as the input NL descriptor of FIG. 7, which may be used to train the intra-class predictor model 808.

The processor 204 may be configured to receive the input NL descriptor 802 (i.e., the NL-i 802) corresponding to the predicted semantic code class associated with the intra-class predictor model 808. The predicted semantic code class may be associated with a subset of NL descriptors and a corresponding subset of PL codes from the set of NL descriptor-PL code pairs 502. The subset of NL descriptors and the corresponding PL codes may be denoted as 804, as shown in FIG. 8. For example, the subset of NL descriptors and the corresponding PL codes (denoted by 804) associated with the predicted semantic code class may include an NL-1-PL-1 804A, an NL-2-PL-2 804B, . . . and an NL-m-PL-m 804M. The processor 204 may be further configured to determine a set of NL-PL pairs based on the input NL descriptor 802 and each PL code, of the set of PL codes 120, associated with the predicted semantic code class. For example, the PL codes, of the set of PL codes 120, associated with the predicted semantic code class may include PL-1, PL-2, . . . and PL-m. In such case, the processor 204 may determine the set of NL-PL pairs, based on the input NL descriptor (e.g., the NL-i 802) as, NL-i-PL-1, NL-i-PL-2, . . . and NL-i-PL-m.

The processor 204 may be further configured to apply the selected intra-class predictor model 808 on each of the determined set of NL descriptor-PL code pairs to determine a similarity score between the input NL descriptor 802 and each PL code, of the set of PL codes, associated with the predicted semantic code class. The application of the intra-class predictor model 808 on each NL descriptor-PL code pair of the set of NL descriptor-PL code pairs may correspond to an inference of the intra-class predictor model 808 on the input NL descriptor 802 and the corresponding PL code. For example, an infer(NL-i-PL-1) 806A may denote the inference of the intra-class predictor model 808 on the input NL descriptor 802 and PL-1. Similarly, the input NL descriptor 802 and the PL-2 may be fed to the intra-class predictor model 808 for an inference, as denoted as an infer(NL-i-PL-2) 806B, and so on. The outcome of the inference by the intra-class predictor model 808 on the input NL descriptor 802 and the PL-1 (denoted by infer(NL-i-PL1) 806A) may result in a determination of a similarity score 810A. Similarly, based on the inference of the input NL descriptor 802 and the PL-2 (denoted by infer(NL-i-PL-2) 806B) by the intra-class predictor model 808, a similarity score 810B may be determined, and so on. In accordance with an embodiment, the similarity score between the input NL descriptor 802 and each PL code of the set of PL codes may lie in a range of −1 to 1.

The processor 204 may be further configured to predict the PL code corresponding to the input NL descriptor based on the determined similarity score. The predicted PL code may be one of the PL codes of the set of PL codes, associated with the predicted semantic code class. In accordance with an embodiment, the processor 204 may apply a Softmax function (denoted by a Softmax 812) on each of the similarity score 810A, the similarity score 810B, . . . and the similarity score 810M. For example, the Softmax function (denoted by Softmax 812) may be represented by equation (6), as follows:

$$\text{Softmax (Similarity Score}_i) = \frac{\exp(\text{Similarity Score}_i)}{\sum_{m=1}^{M} \exp(\text{Similarity Score}_m)} \quad (6)$$

where, 'exp(.)' may represent an exponential function,
'M' may represent the number of PL codes clustered in the particular semantic code class, and
'Similarity Score$_i$' may represent the similarity score between the i$^{th}$ PL code and the input NL descriptor 802.

The Softmax 812 may convert the similarity score between the input NL descriptor 802 and each PL code to a probability value indicative of a likelihood of the corresponding PL code being associated with the input NL descriptor 802. The processor 204 may determine a PL code (for example, PL-1, PL-2, . . . , or PL-m) with the highest value of probability as the predicted PL-code corresponding with the input NL descriptor 802. For example, a predicted code PL-i 814 may be determined. The training of the selected intra-class predictor model 808 may be further based on the predicted PL code (PL-i 814) corresponding to the input NL descriptor 802 and an actual PL code corresponding to the NL descriptor 802 (if the predicted PL code (PL-i 814) is determined to be different from the actual PL code). In an embodiment, the training of the intra-class predictor model 808 may correspond to a fine-tuning of the intra-class predictor model 808, which may be boot-strapped with an initial set of weights and parameters.

For example, the intra-class predictor model 808 may be an ML model, such as, a regression model that may be trained to identify a relationship between inputs and output labels. Examples of the inputs may include features in a training dataset (such as, the subset of NL descriptors and the corresponding PL codes, denoted as 804) and the output labels may include PL codes. The ML model of the intra-class predictor model 808 may be defined by its hyper-parameters, for example, number of weights, cost function, input size, number of layers, and the like. The parameters of the ML model of the intra-class predictor model 808 may be tuned, and weights may be updated so as to move towards a global minima of a cost function for the ML model. After several epochs of the training on the feature information in the training dataset, the ML model of the intra-class predictor model 808 may be trained to output a prediction result for a set of inputs. The prediction result may include probability values that may indicate a degree of association of the input NL descriptor 802 with respect to the various PL codes associated with the semantic code class corresponding to the intra-class predictor model 808. The PL code with the highest probability value may correspond to the predicted PL code for the input NL descriptor 802. Thus, the regression result may be indicative of a predicted PL code for each input of the set of inputs (e.g., a new/unseen instance of an NL descriptor).

It should be noted that the scenario 800 of FIG. 8 is for exemplary purposes and should not be construed to limit the scope of the disclosure.

Figure 9:
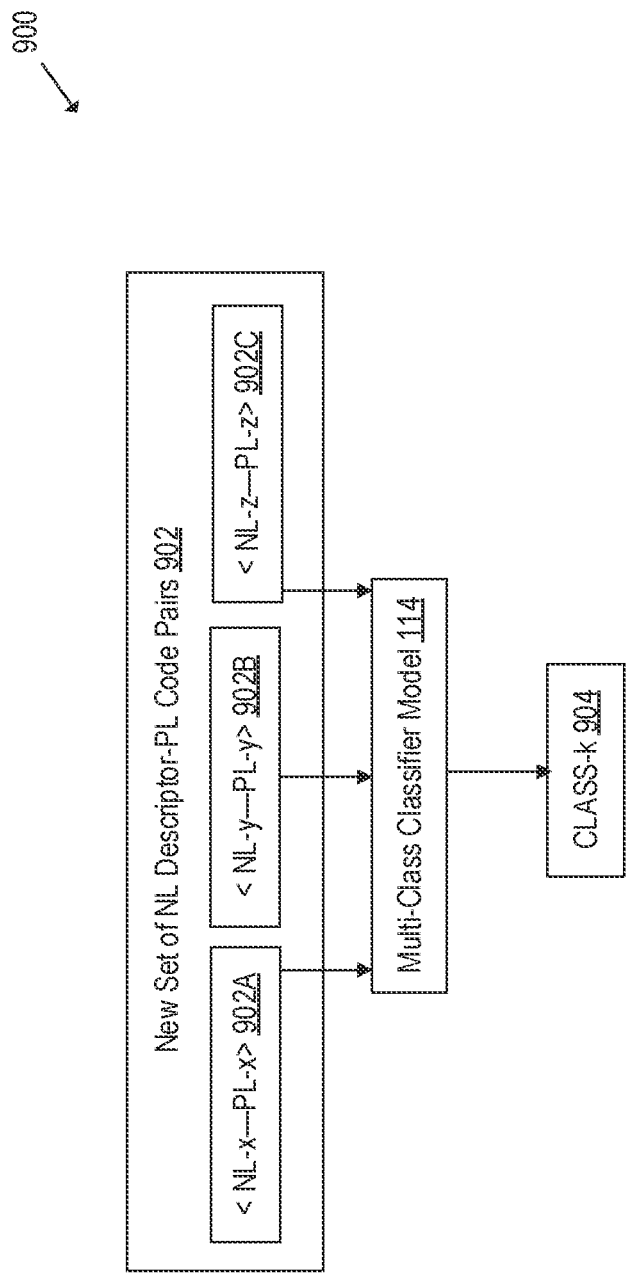
FIG. 9 is a diagram that illustrates an exemplary scenario for a prediction of a semantic code class associated with a new set of NL descriptors and corresponding new set of PL codes.

FIG. 9 is a diagram that illustrates an exemplary scenario for a prediction of a semantic code class associated with a new set of NL descriptors and corresponding new set of PL codes, according to at least one embodiment described in the present disclosure. FIG. 9 is explained in conjunction with elements from FIG. 1, FIG. 2, FIG. 3, FIG. 4, FIG. 5, FIG. 6, FIG. 7, and FIG. 8. With reference to FIG. 9, there is shown an exemplary scenario 900. The scenario 900 may include elements of FIG. 1, such as, the multi-class classifier model 114. There is further shown a new set of NL descriptor-PL code pairs 902.

In accordance with an embodiment, the processor 204 may be configured to receive a new set of NL descriptors and a corresponding new set of PL codes (such as, the new set of NL descriptor-PL code pairs 902). For example, as shown in FIG. 9, the new set of NL descriptor-PL code pairs 902 may include the received new set of NL descriptors, viz., NL-x, NL-y, and NL-z; and the received new set of PL codes, viz., PL-x, PL-y, and PL-z. The new set of NL descriptor-PL code pairs 902 may include NL-descriptor-PL code pairs, such as, a pair of NL-x and corresponding PL-x (i.e., NL-x-PL-x 902A), a pair of NL-y and corresponding PL-y (i.e., NL-y-PL-y 902B), and a pair of NL-z and corresponding PL-z (i.e., NL-x-PL-x 902C).

The processor 204 may be further configured to apply the trained multi-class classifier model 114 on the received new set of NL descriptors and the received new set of PL codes. The trained multi-class classifier model 114 may be applied on the new set of NL descriptors and the new set of PL codes to associate each of NL-x, NL-y, and NL-z, and each of PL-x, PL-y, and PL-z, to a class of the set of semantic code classes. The processor 204 may be further configured to predict one or more semantic code classes associated with the new set of PL codes, i.e., PL-x, PL-y, and PL-z, based on the application of the trained multi-class classifier model 114 on the received new set of NL descriptors and the received new set of PL codes. For example, as shown in FIG. 9, the trained multi-class classifier model 114 may predict an existing semantic code class, such as, a class-k 904 as being associated with the received new set of PL codes.

In accordance with an embodiment, the processor 204 may be configured to determine a number of PL codes, of the set of PL codes 120, that may be classified in each of the set of semantic code classes. For example, the number of the set of semantic code classes, as determined by the statistical model 112, is '3'. The set of semantic code classes may include semantic code classes, such as, a class-x, a class-y, and a class-z. The set of PL codes 120 may include 24 PL codes, where 6 PL codes may be classified in the class-x, 8 PL codes may be classified in the class-y, and 10 PL codes may be classified in the class-z. The processor 204 may be further configured to select a first semantic code class from the set of semantic code classes based on the determined number of PL codes and a pre-determined threshold number. For example, if the pre-determined threshold number is 9, the processor 204 may select class-z as the first semantic code class based on determination of the number of PL codes classified in class-z. As 10 PL codes may be classified in class-z, which is greater than the pre-determined threshold number is 9, class-z may be selected. In an example, the pre-determined threshold number associated with a semantic code class may correspond to a pre-defined percentage (e.g., 50%) of an average of a number of PL codes clustered in the remaining semantic code classes. The pre-determined threshold number may correspond to a maximum permissible size of each semantic code class. Thus, the pre-determined threshold number may limit the number of PL codes that may be classified in each semantic code class, thereby providing a deterministic upper-bound to a complexity of the PL code retrieval process.

The processor 204 may be further configured to split the selected first semantic code class into a plurality of second semantic code classes. For example, the plurality of second semantic code classes may include semantic code classes, such as, a class-z1 and a class-z2. The selected first semantic (i.e., the class-z) may be split into the second semantic code classes, viz., the class-z1 and the class-z2. The processor 204 may be further configured to re-cluster a plurality of PL codes associated with the selected first semantic code class (i.e., the class-z) into the plurality of second semantic code classes (i.e., the class-z1 and the class-z2). For example, the 10 PL codes associated with the selected first semantic code class (i.e., the class-z), may be re-clustered into the two second semantic code classes (i.e., the class-z1 and the class-z2). The processor 204 may be further configured to re-train the multi-class classifier model 114 based on the re-clustered plurality of PL codes and the plurality of second semantic code classes. For example, the multi-class classifier model 114 may be re-trained based on 10 re-clustered PL codes, i.e., the class-z1, and the class-z2.

The disclosed electronic device 102 may cluster a new NL descriptor-PL code pair into a pre-existing semantic code class, instead of a re-classification of the entire set of NL descriptor-PL code pairs 502. Further, since a binary classification may be performed on each record within a semantic code class for code retrieval, no additional training or fine-tuning of the multi-class classifier model 114 or the set of intra-class predictor models 116 may be required. Additionally, in case a semantic code class is expended with a large number of PL codes, the disclosed electronic device 102 may split up the semantic code class into multiple classes. The process of determination of whether a certain semantic code class includes a large number of PL codes may be performed periodically (e.g., once per month, depending on a total number of PL codes) and/or every time new NL descriptors and corresponding PL codes may be received.

It should be noted that the scenario 900 of FIG. 9 is for exemplary purposes and should not be construed to limit the scope of the disclosure.

Figure 10:
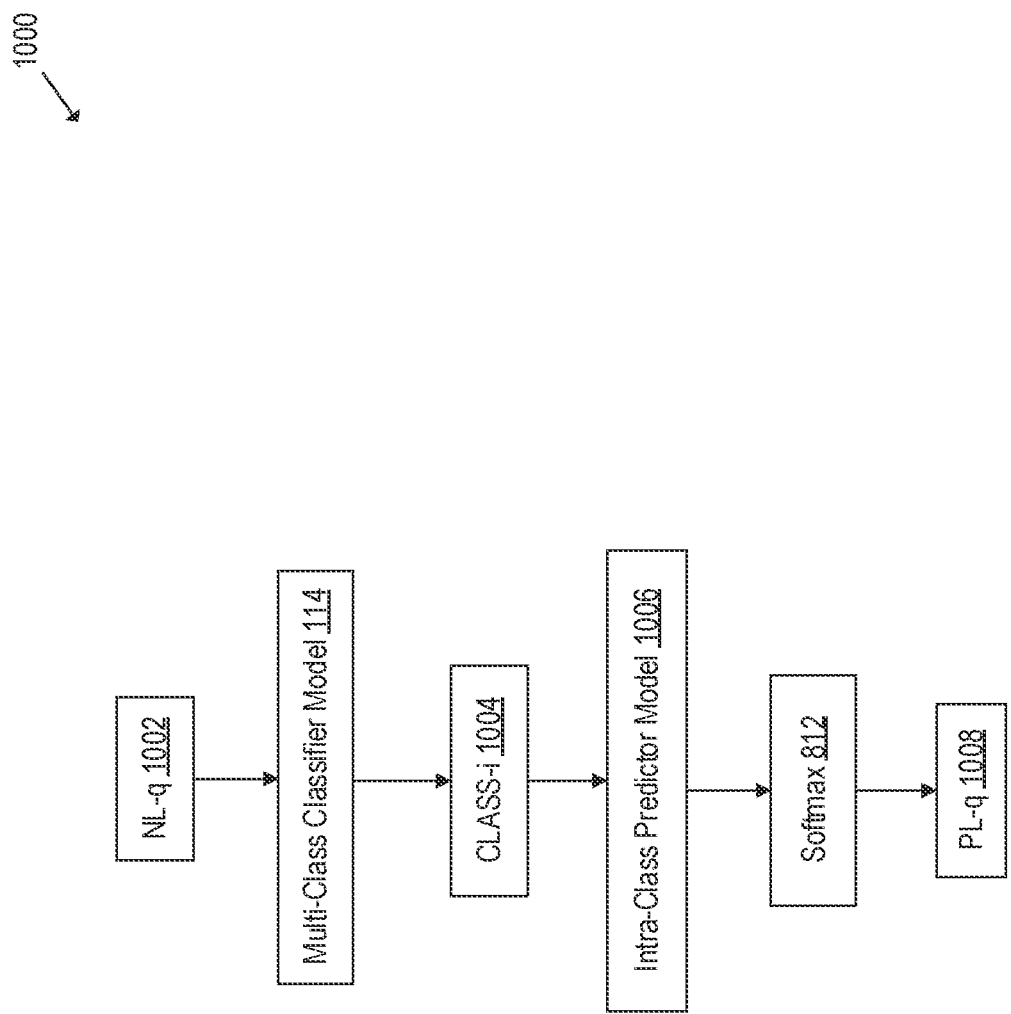
FIG. 10 is a diagram that illustrates an exemplary scenario for a prediction of an output PL code corresponding to a queried NL descriptor.

FIG. 10 is a diagram that illustrates an exemplary scenario for a prediction of an output PL code corresponding to a queried NL descriptor, according to at least one embodiment described in the present disclosure. FIG. 10 is explained in conjunction with elements from FIG. 1, FIG. 2, FIG. 3, FIG. 4, FIG. 5, FIG. 6, FIG. 7, FIG. 8, and FIG. 9. With reference to FIG. 10, there is shown an exemplary scenario 1000. The scenario 1000 includes elements of FIG. 1 and FIG. 8, such as, the multi-class classifier model 114 (of FIG. 1) and the Softmax 812 (of FIG. 8). There is further shown a queried NL descriptor 1002, a predicted semantic code class (e.g., a class-i 1004), an intra-class predictor model 1006, and a predicted PL code (e.g., a PL-q 1008). The processor 204 may be configured to predict the PL-q 1008 that may correspond to the queried NL descriptor 1002, as described herein.

The processor 204 may be configured to receive the queried NL descriptor 1002. The queried NL descriptor 1002 may be received as a user input from the user device 106, via the communication network 108. For example, the queried NL descriptor 1002 may be received as a textual query or a voice query from the user 122 associated with the user device 106. The queried NL descriptor 1002 may also be received via the I/O device 210. The processor 204 may be further configured to apply the trained multi-class classifier model 114 on the queried NL descriptor 1002 to predict a queried semantic code class, of the set of semantic code classes, corresponding to the queried NL descriptor 1002. In an example, the queried semantic code class may be class-i 1004 as the predicted semantic code class. The multi-class classifier model 114 may predict the class-i 1004 as an output semantic code class of the set of semantic code classes, which may be associated with the queried NL descriptor 1002. The processor 204 may be further configured to select a queried intra-class predictor model based on the queried semantic code class (i.e., the class-i 1004). In an example, the queried intra-class predictor model may be the intra-class predictor model 1006. The queried intra-class predictor model 1006 may be identical to an intra-class predictor model of the set of the intra-class predictor models 116.

The processor 204 may be further configured to determine a set of NL descriptor-PL code pairs based on the queried NL descriptor 1002 and each PL code, of the set of PL codes 120, associated with the queried semantic code class (i.e., the class-i 1004), as described, for example, in FIG. 8. The determined set of NL descriptor-PL code pairs may include PL codes associated with the class-i 1004. The processor 204 may be further configured to apply the queried intra-class predictor model 1006 on each of the determined set of NL descriptor-PL code pairs to determine a similarity score between the queried NL descriptor 1002 and each PL code, of the set of PL codes 120, associated with the semantic code class, as described, for example, in FIG. 8. The processor 204 may further determine the similarity score between the queried NL descriptor 1002 and each PL code based on an outcome associated with an inference of the intra-class predictor model 1006 on the queried NL descriptor 1002 and each PL code associated with the class-i 1004.

The processor 204 may be further configured to predict the output PL code corresponding to the queried NL descriptor 1002 based on the determined similarity score. The processor 204 may apply the Softmax 812 on the similarity score between the queried NL descriptor 1002 and each PL code associated with the class-i 1004. The Softmax 812 may convert the similarity score between the input NL descriptor 802 and each PL code to a probability value indicative of a degree of association of each PL code (corresponding to the class-i 1004) with respect to the queried NL descriptor 1002. A PL code with the highest probability value may be determined as an output PL code from PL codes associated with the class-i 1004. For example, the probability of a PL code, such as, the PL-q 1008 corresponding to the queried NL descriptor 1002 may be the highest probability value among the probabilities values of each of the PL codes corresponding to the queried NL descriptor 1002. Therefore, the PL-q 1008 may be predicted as the output PL code corresponding to the queried NL descriptor 1002.

The processor 204 may be further configured to control the display device 214 to display the predicted output PL code (i.e., the PL-q 1008). The output PL code may be displayed along with the queried NL descriptor 1002. In other words, processor 204 may be further configured to control the display device 214 to display the predicted output PL code (i.e., the PL-q 1008) in response to the queried NL descriptor 1002. The output PL code may also be displayed on the user device 106.

It should be noted that scenario 1000 of FIG. 10 is for exemplary purposes and should not be construed to limit the scope of the disclosure.

Source code retrieval may be useful for source code re-use within an organization or across organizations. For search code retrieval, a natural language based textual string may be used as a query to search for a source code from a source code corpus to retrieve a programming language code that may be related to the textual string in the query. Conventional solutions for source code retrieval based on textual strings may be complex and time consuming due to a large number of source codes that may be required to be searched from the source code corpus. The complexity involved in the process of the source code retrieval may be further exasperated by a sheer number of lines of code in each source code segment, and a number of possible combinations of text strings that may be associated with each of the source code segments. For example, with millions/billions of lines of source codes, it may be infeasible to train and fine-tune language models to search and retrieve a source code segment, given a textual query.

On the other hand, the disclosed electronic device 102 may simplify the retrieval of source codes, such as PL codes, based on a classification or cluster of a large corpus of PL codes and associated NL descriptions into a set of semantic code classes (as described, for example, at 410 in FIG. 4). The disclosed electronic device 102 may train the multi-class classifier model 114 and the set of intra-class predictor models 116, where each of the set of intra-class predictor models 116 may be associated with a certain semantic code classes from the set of semantic code classes (as described, for example, at 410 in FIG. 4). The multi-class classifier model 114 may be configured to predict a semantic code class of the set of semantic code classes, corresponding to a queried NL descriptor as described, for example, in FIG. 10. An intra-class predictor model associated with the semantic code class predicted for the queried NL descriptor may be configured to predict a PL code corresponding to the queried NL descriptor query. Herein, the PL code corresponding to the queried NL descriptor may be predicted from PL codes that may be classified into the semantic code class predicted for the queried NL descriptor as described, for example, in FIG. 10. Thus, the PL codes may be semantically classified into the various semantic code classes. As the multi-class classifier model 114 may predict the semantic code class associated with the queried NL descriptor, a search space for the semantic search problem to predict an appropriate PL code may be reduced to the PL codes that may belong to the predicted semantic code class. The intra-class predictor model, which may be associated with the predicted semantic code class, may search through the reduced search space (associated with the predicted semantic code class) to predict the appropriate PL code associated with the queried NL descriptor efficiently. Therefore, the overall complexity and time involved in the search (prediction) and retrieval of a PL code based on a queried NL descriptor may be significantly reduced, as each semantic code class may include a lesser number of PL codes as compared to the total number of PL codes in the corpus of PL codes.

In an experimental setting, the disclosed code retrieval process was found to be approximately 20 times faster than conventional code retrieval solutions. For example, for a conventional code retrieval process that used a CodeBERT language model on a source code corpus of 1 million code records, each inference through a GPU chipset required 2 milliseconds processing time. Thus, a search of a single NL text query on the GPU chipset required approximately 33 minutes. On the other hand, in the disclosed source code retrieval process, consider that the number of semantic code classes is 20 and the number of PL codes clustered in each semantic code class are close to 50,000. In such case, the time required for source code retrieval may be proportional to a time required for inference on 50,000 PL codes, instead of an inference on the entire set of 1 million PL codes, as in the case of the conventional solutions. Experimentally, the inference time on 50,000 PL codes was found to be to the tune of about 100 seconds. The total time required for the disclosed source code retrieval process was found to be 100+α seconds, where a may represent a time required for a single NL query on a multi-class inference with O(1). Thus, the total time for source code retrieval may reduce from 33 minutes to about 100 seconds, which is a difference of a factor of 20. Therefore, the disclosed electronic device 102 may provide a significant improvement in the existing technology space of code searching and retrieval. The significant improvement may be provided by reducing the search time substantially by clustering PL codes into the set of semantic code classes and using the multi-class classifier model 114 and the set of intra-class predictor models 116 to predict a PL code associated with a queried NL descriptor.

Various embodiments of the disclosure may provide one or more non-transitory computer-readable storage media configured to store instructions that, in response to being executed, cause a system (such as, the example electronic device 102) to perform operations. The operations may include receiving a set of NL descriptors and a corresponding set of PL codes. The operations may further include determining a first vector associated with each of the received set of NL descriptors, based on a first language model. The operations may further include determining a second vector associated with each of the received set of PL codes, based on a second language model, wherein the second language model may be different from the first language model. The operations may further include determining, using a statistical model, the number of a set of semantic code classes to cluster the set of PL codes. The operations may further include clustering the set of PL codes into the set of semantic code classes, based on the determined number, the determined first vector, and the determined second vector. The operations may further include training a multi-class classifier model configured to predict a semantic code class, from the set of semantic code classes, corresponding to an input NL descriptor. The predicted semantic code class may be associated with a PL code corresponding to the input NL descriptor. The multi-class classifier model may be trained based on the set of NL descriptors, the set of PL codes corresponding to the set of NL descriptors, and the set of semantic code classes in which the set of PL codes are clustered. The operations may further include selecting an intra-class predictor model from a set of intra-class predictor models, based on the predicted semantic code class. The operations may further include training the selected intra-class predictor model based on the input NL descriptor, wherein the selected intra-class predictor model may be configured to predict the PL code corresponding to the input NL descriptor.

As used in the present disclosure, the terms "module" or "component" may refer to specific hardware implementations configured to perform the actions of the module or component and/or software objects or software routines that may be stored on and/or executed by general purpose hardware (e.g., computer-readable media, processing devices, etc.) of the computing system. In some embodiments, the different components, modules, engines, and services described in the present disclosure may be implemented as objects or processes that execute on the computing system (e.g., as separate threads). While some of the system and methods described in the present disclosure are generally described as being implemented in software (stored on and/or executed by general purpose hardware), specific hardware implementations or a combination of software and specific hardware implementations are also possible and contemplated. In this description, a "computing entity" may be any computing system as previously defined in the present disclosure, or any module or combination of modulates running on a computing system.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

All examples and conditional language recited in the present disclosure are intended for pedagogical objects to aid the reader in understanding the present disclosure and the concepts contributed by the inventor to furthering the art and are to be construed as being without limitation to such specifically recited examples and conditions. Although embodiments of the present disclosure have been described in detail, various changes, substitutions, and alterations could be made hereto without departing from the spirit and scope of the present disclosure.

What is claimed is:

1. A method, executed by a processor, comprising:
receiving a set of natural language (NL) descriptors and a corresponding set of programming language (PL) codes;
determining a first vector associated with each of the received set of NL descriptors, based on a first machine-learning language model;
determining a second vector associated with each of the received set of PL codes, based on a second machine-learning language model, the second machine-learning language model is different from the first machine-learning language model;
determining, using a statistical model, a number of a set of semantic code classes to cluster the set of PL codes;
clustering the set of PL codes into the set of semantic code classes, based on the determined number, the determined first vector, and the determined second vector;
training a multi-class classifier model configured to predict a semantic code class, from the set of semantic code classes, corresponding to an input NL descriptor, wherein
the predicted semantic code class is associated with a PL code corresponding to the input NL descriptor, and
the multi-class classifier model is trained based on the set of NL descriptors, the set of PL codes corresponding to the set of NL descriptors, and the set of semantic code classes in which the set of PL codes are clustered;
selecting an intra-class predictor model from a set of intra-class predictor models, based on the predicted semantic code class; and
training the selected intra-class predictor model based on the input NL descriptor, the selected intra-class predictor model is configured to predict the PL code corresponding to the input NL descriptor for source code re-use or retrieval.

2. The method according to claim 1, wherein the first machine-learning language model corresponds to at least one of: a Bi-directional Encoder Representations from Transformer (BERT) language model, a Generative Pre-trained Transformer-2 (GPT-2) language model, a GPT-3 language model, or a Deep Neural Network (DNN)-based natural language processing (NLP) model.

3. The method according to claim 1, wherein the second machine-learning language model corresponds to at least one of: an Augmented Code (Aug-Code) language model, a Code-BERT language model, or a Code-GPT language model.

4. The method according to claim 1, wherein the statistical model corresponds to at least one of: a gap statistical model, an average silhouette statistical model, or an elbow statistical model.

5. The method according to claim 1, further comprising:
concatenating the first vector associated with each NL descriptor of the set of NL descriptors and the second vector associated with corresponding PL code of the set of PL codes to determine a feature vector associated with each pair of NL descriptor and corresponding PL code,
wherein the set of PL codes are clustered into the set of semantic code classes, further based on the determined feature vector associated with each pair of NL descriptor and the corresponding PL code.

6. The method according to claim 1, wherein each of the set of semantic code classes corresponds to at least one of:
an abstract syntax tree (AST) representation associated with a PL code grammar,
an NL language grammar associated with an NL code descriptor,
a set of synonymous words and codes,
a code similarity metrics, or
a set of semantically equivalent words and codes.

7. The method according to claim 1, wherein the set of PL codes are clustered into the set of semantic code classes using a k-means clustering technique.

8. The method according to claim 1, further comprising:
generating a set of positive examples and a set of negative examples from a dataset including the set of NL descriptors, the corresponding set of PL codes, and the corresponding set of semantic code classes;
applying the second machine-learning language model on one or more subsets of the generated set of positive examples and one or more subsets of the generated set of negative examples to determine a first subset of the set of semantic code classes; and
applying the multi-class classifier model on a subset of the generated set of positive examples to determine a second subset of the set of semantic code classes;
wherein the training of the multi-class classifier model is based on the generated set of positive examples, the generated set of negative examples, the determined first subset of semantic code classes, and the determined second subset of semantic code classes.

9. The method according to claim 1, further comprising:
receiving the input NL descriptor corresponding to the predicted semantic code class associated with the intra-class predictor model;
determining a set of NL-PL pairs based on the input NL descriptor and each PL code, of the set of PL codes, associated with the predicted semantic code class;
applying the selected intra-class predictor model on each of the determined set of NL-PL pairs to determine a similarity score between the input NL descriptor and each PL code, of the set of PL codes, associated with the predicted semantic code class; and
predicting the PL code corresponding to the input NL descriptor based on the determined similarity score,
wherein the training of the selected intra-class predictor model is further based on the predicted PL code corresponding to the input NL descriptor and an actual PL code corresponding to the NL descriptor.

10. The method according to claim 1, further comprising:
receiving a new set of NL descriptors and a corresponding new set of PL codes;
applying the trained multi-class classifier model on the received new set of NL descriptors and the received new set of PL codes; and
predicting one or more semantic code classes associated with the new set of PL codes based on the application of the trained multi-class classifier model on the received new set of NL descriptors and the received new set of PL codes.

11. The method according to claim 1, further comprising:
determining a number of PL codes, of the set of PL codes, classified in each of the set of semantic code classes;
selecting a first semantic code class from the set of semantic code classes based on the determined number of PL codes and a pre-determined threshold number;
splitting the selected first semantic code class into a plurality of second semantic code classes;

re-clustering a plurality of PL codes associated with the selected first semantic code class into the plurality of second semantic code classes; and re-training the multi-class classifier model based on the re-clustered plurality of PL codes and the plurality of second semantic code classes.

12. The method according to claim 1, further comprising:
receiving a queried NL descriptor;
applying the trained multi-class classifier model on the queried NL descriptor to predict a queried semantic code class, of the set of semantic code classes, corresponding to the queried NL descriptor;
selecting a queried intra-class predictor model based on the queried semantic code class;
determining a set of NL-PL pairs based on the queried NL descriptor and each PL code, of the set of PL codes, associated with the queried semantic code class;
applying the queried intra-class predictor model on each of the determined set of NL-PL pairs to determine a similarity score between the queried NL descriptor and each PL code, of the set of PL codes, associated with the semantic code class;
predicting an output PL code corresponding to the queried NL descriptor based on the determined similarity score; and
controlling a display device to display the predicted output PL code in response to the queried NL descriptor.

13. One or more non-transitory computer-readable storage media configured to store instructions that, in response to being executed, cause an electronic device to perform operations, the operations comprising:
receiving a set of natural language (NL) descriptors and a corresponding set of programming language (PL) codes;
determining a first vector associated with each of the received set of NL descriptors, based on a first machine-learning language model;
determining a second vector associated with each of the received set of PL codes, based on a second machine-learning language model, the second machine-learning language model is different from the first machine-learning language model;
determining, using a statistical model, a number of a set of semantic code classes to cluster the set of PL codes;
clustering the set of PL codes into the set of semantic code classes, based on the determined number, the determined first vector, and the determined second vector;
training a multi-class classifier model configured to predict a semantic code class, from the set of semantic code classes, corresponding to an input NL descriptor, wherein
the predicted semantic code class is associated with a PL code corresponding to the input NL descriptor, and
the multi-class classifier model is trained based on the set of NL descriptors, the set of PL codes corresponding to the set of NL descriptors, and the set of semantic code classes in which the set of PL codes are clustered;
selecting an intra-class predictor model from a set of intra-class predictor models, based on the predicted semantic code class; and
training the selected intra-class predictor model based on the input NL descriptor, the selected intra-class predictor model is configured to predict the PL code corresponding to the input NL descriptor for source code re-use or retrieval.

14. The one or more non-transitory computer-readable storage media according to claim 13, wherein each of the set of semantic code classes corresponds to at least one of:
an abstract syntax tree (AST) representation associated with a PL code grammar,
an NL language grammar associated with an NL code descriptor,
a set of synonymous words and codes,
a code similarity metrics, or
a set of semantically equivalent words and codes.

15. The one or more non-transitory computer-readable storage media according to claim 13, wherein the operations further comprise:
generating a set of positive examples and a set of negative examples from a dataset including the set of NL descriptors, the corresponding set of PL codes, and the corresponding set of semantic code classes;
applying the second machine-learning language model on one or more subsets of the generated set of positive examples and one or more subsets of the generated set of negative examples to determine a first subset of the set of semantic code classes; and
applying the multi-class classifier model on a subset of the generated set of positive examples to determine a second subset of the set of semantic code classes;
wherein the training of the multi-class classifier model is based on the generated set of positive examples, the generated set of negative examples, the determined first subset of semantic code classes, and the determined second subset of semantic code classes.

16. The one or more non-transitory computer-readable storage media according to claim 13, wherein the operations further comprise:
receiving the input NL descriptor corresponding to the predicted semantic code class associated with the intra-class predictor model;
determining a set of NL-PL pairs based on the input NL descriptor and each PL code, of the set of PL codes, associated with the predicted semantic code class;
applying the selected intra-class predictor model on each of the determined set of NL-PL pairs to determine a similarity score between the input NL descriptor and each PL code, of the set of PL codes, associated with the predicted semantic code class; and
predicting the PL code corresponding to the input NL descriptor based on the determined similarity score,
wherein the training of the selected intra-class predictor model is further based on the predicted PL code corresponding to the input NL descriptor and an actual PL code corresponding to the NL descriptor.

17. The one or more non-transitory computer-readable storage media according to claim 13, wherein the operations further comprise:
receiving a new set of NL descriptors and a corresponding new set of PL codes;
applying the trained multi-class classifier model on the received new set of NL descriptors and the received new set of PL codes; and
predicting one or more semantic code classes associated with the new set of PL codes based on the application of the trained multi-class classifier model on the received new set of NL descriptors and the received new set of PL codes.

18. The one or more non-transitory computer-readable storage media according to claim 13, wherein the operations further comprise:
- determining a number of PL codes, of the set of PL codes, classified in each of the set of semantic code classes;
- selecting a first semantic code class from the set of semantic code classes based on the determined number of PL codes and a pre-determined threshold number;
- splitting the selected first semantic code class into a plurality of second semantic code classes;
- re-clustering a plurality of PL codes associated with the selected first semantic code class into the plurality of second semantic code classes; and
- re-training the multi-class classifier model based on the re-clustered plurality of PL codes and the plurality of second semantic code classes.

19. The one or more non-transitory computer-readable storage media according to claim 13, wherein the operations further comprise:
- receiving a queried NL descriptor;
- applying the trained multi-class classifier model on the queried NL descriptor to predict a queried semantic code class, of the set of semantic code classes, corresponding to the queried NL descriptor;
- selecting a queried intra-class predictor model based on the queried semantic code class;
- determining a set of NL-PL pairs based on the queried NL descriptor and each PL code, of the set of PL codes, associated with the queried semantic code class;
- applying the queried intra-class predictor model on each of the determined set of NL-PL pairs to determine a similarity score between the queried NL descriptor and each PL code, of the set of PL codes, associated with the semantic code class;
- predicting an output PL code corresponding to the queried NL descriptor based on the determined similarity score; and
- controlling a display device to display the predicted output PL code in response to the queried NL descriptor.

20. An electronic device, comprising:
a memory storing instructions; and
a processor, coupled to the memory, that executes the instructions to perform a process comprising:
- receiving a set of natural language (NL) descriptors and a corresponding set of programming language (PL) codes;
- determining a first vector associated with each of the received set of NL descriptors, based on a first machine-learning language model;
- determining a second vector associated with each of the received set of PL codes, based on a second machine-learning language model, the second machine-learning language model is different from the first machine-learning language model;
- determining, using a statistical model, a number of a set of semantic code classes to cluster the set of PL codes;
- clustering the set of PL codes into the set of semantic code classes, based on the determined number, the determined first vector, and the determined second vector;
- training a multi-class classifier model configured to predict a semantic code class, from the set of semantic code classes, corresponding to an input NL descriptor, wherein
  - the predicted semantic code class is associated with a PL code corresponding to the input NL descriptor, and
  - the multi-class classifier model is trained based on the set of NL descriptors, the set of PL codes corresponding to the set of NL descriptors, and the set of semantic code classes in which the set of PL codes are clustered;
- selecting an intra-class predictor model from a set of intra-class predictor models, based on the predicted semantic code class; and
- training the selected intra-class predictor model based on the input NL descriptor, the selected intra-class predictor model is configured to predict the PL code corresponding to the input NL descriptor for source code re-use or retrieval.

* * * * *